April 30, 1946.   J. F. PETERS   2,399,250
CAN END ASSEMBLING MACHINE
Filed Feb. 25, 1943   12 Sheets-Sheet 1

INVENTOR.
John F. Peters
BY Ivan D. Thornburgh
Charles H. Erne
ATTORNEYS

April 30, 1946. J. F. PETERS 2,399,250
CAN END ASSEMBLING MACHINE
Filed Feb. 25, 1943 12 Sheets-Sheet 3

INVENTOR.
John F. Peters
BY Ivan D. Thornburgh
Charles H. Erne
ATTORNEYS

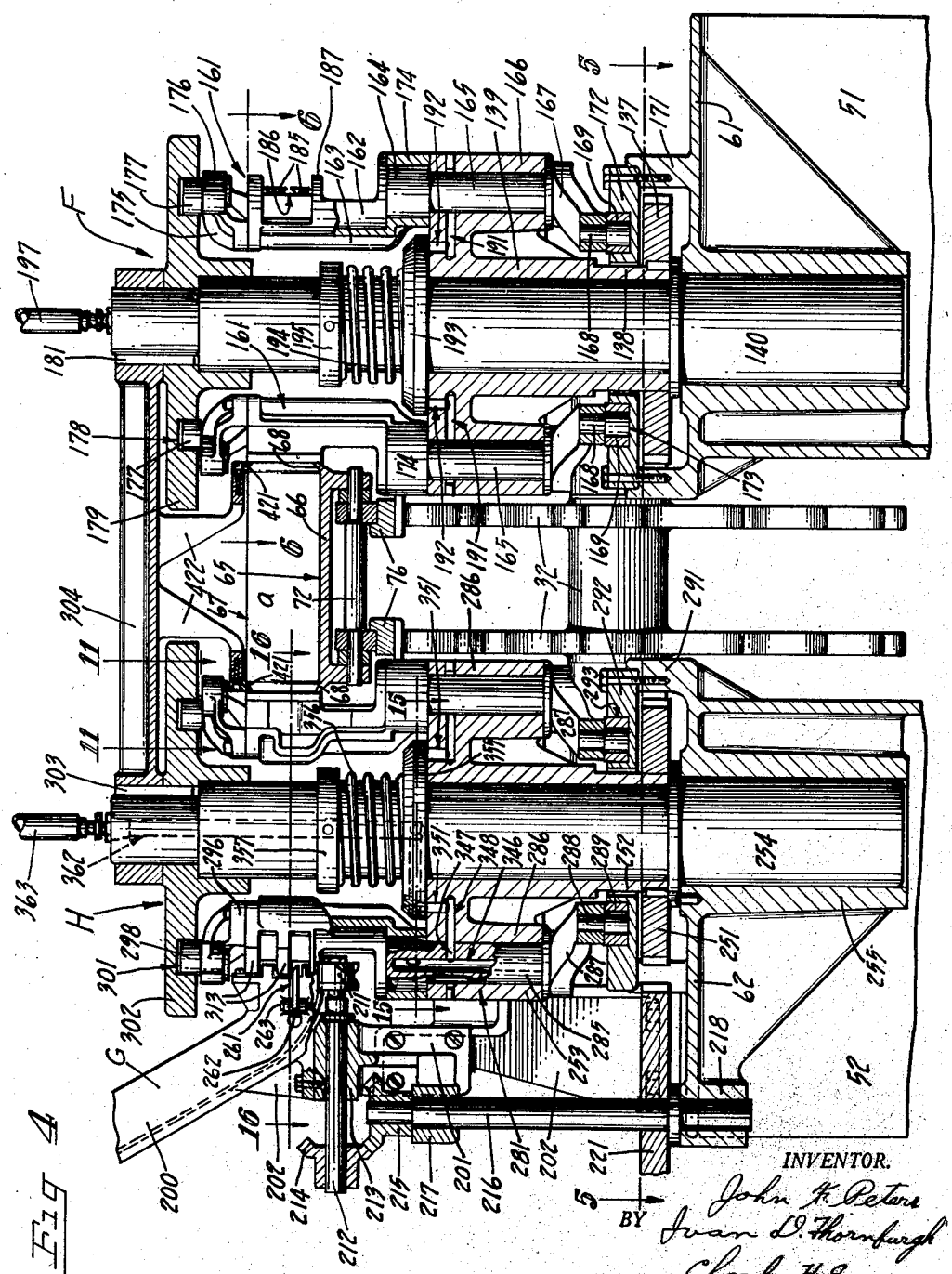

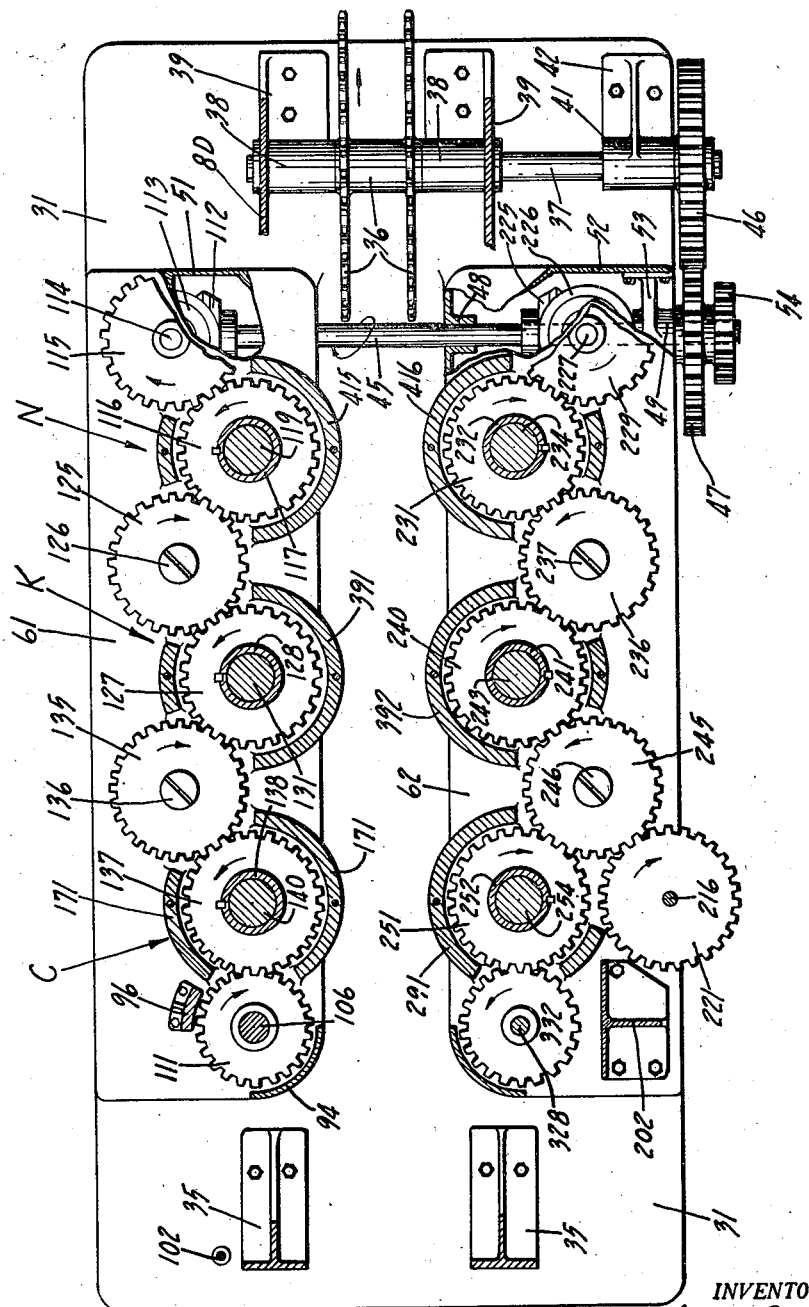

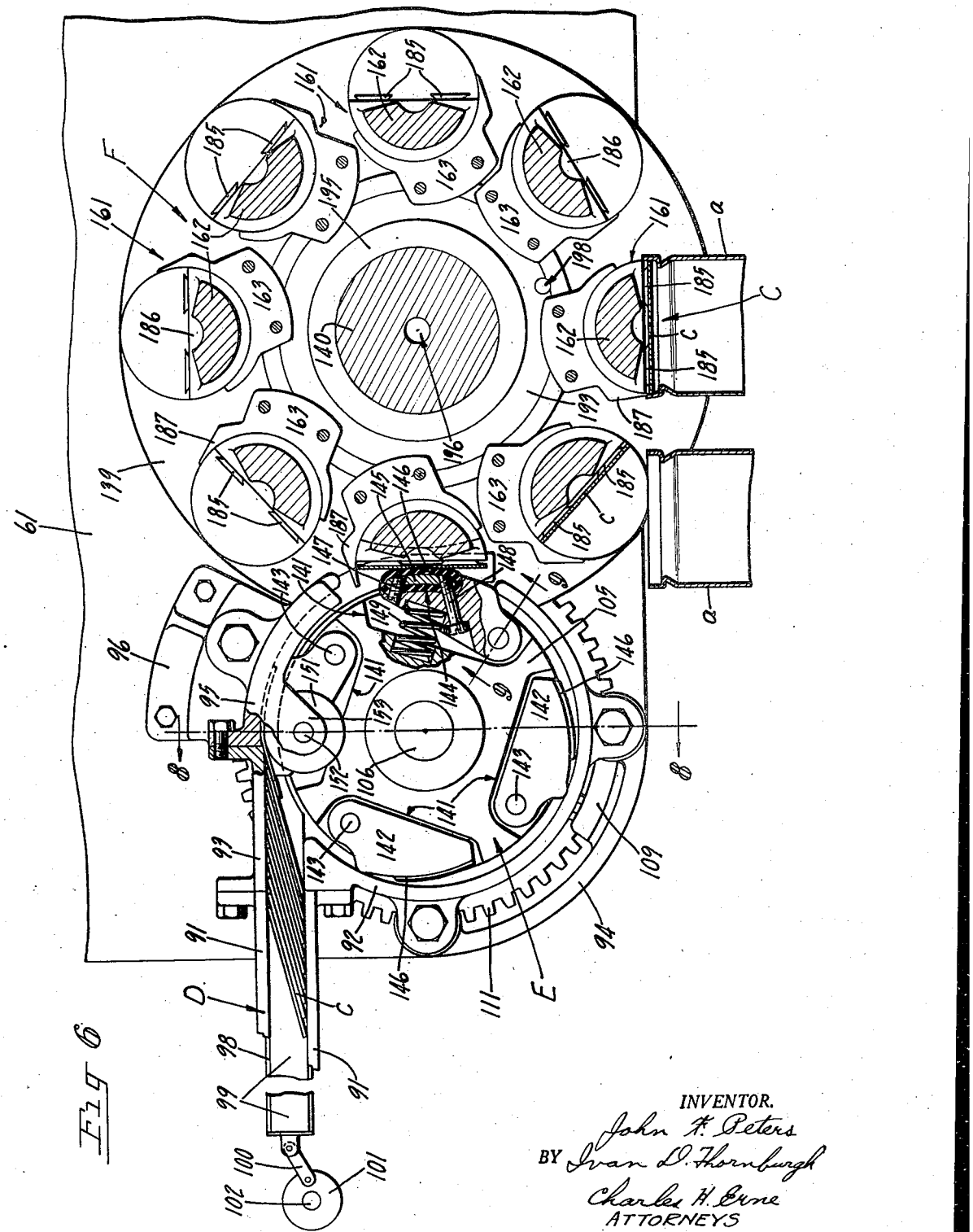

April 30, 1946.  J. F. PETERS  2,399,250
CAN END ASSEMBLING MACHINE
Filed Feb. 25, 1943  12 Sheets-Sheet 7
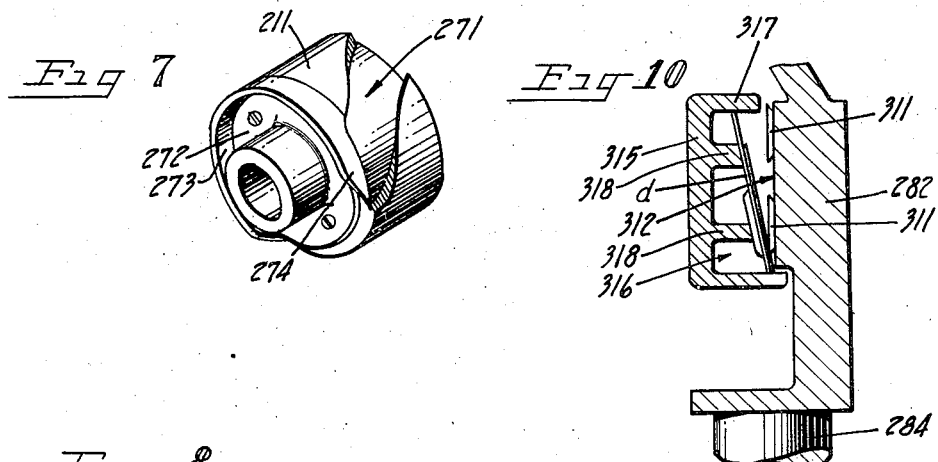
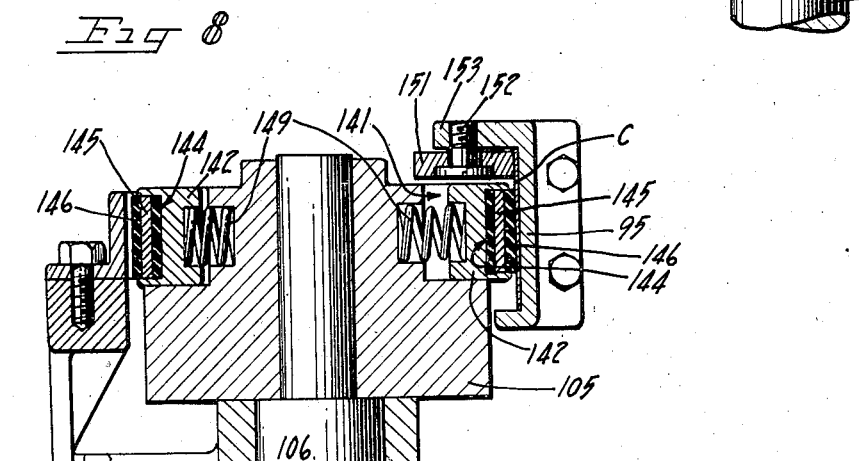
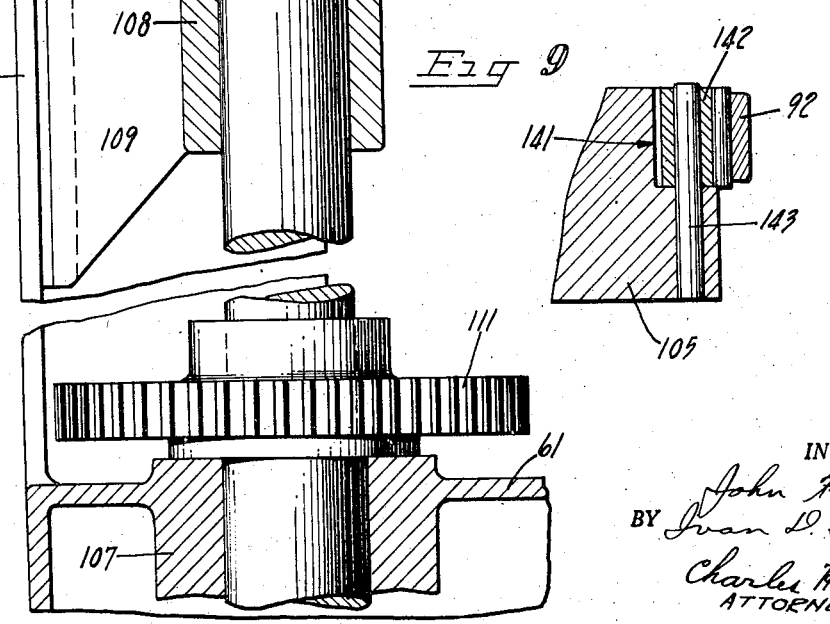
INVENTOR.
John F. Peters
BY Ivan D. Thornburgh
Charles H. Eune
ATTORNEYS

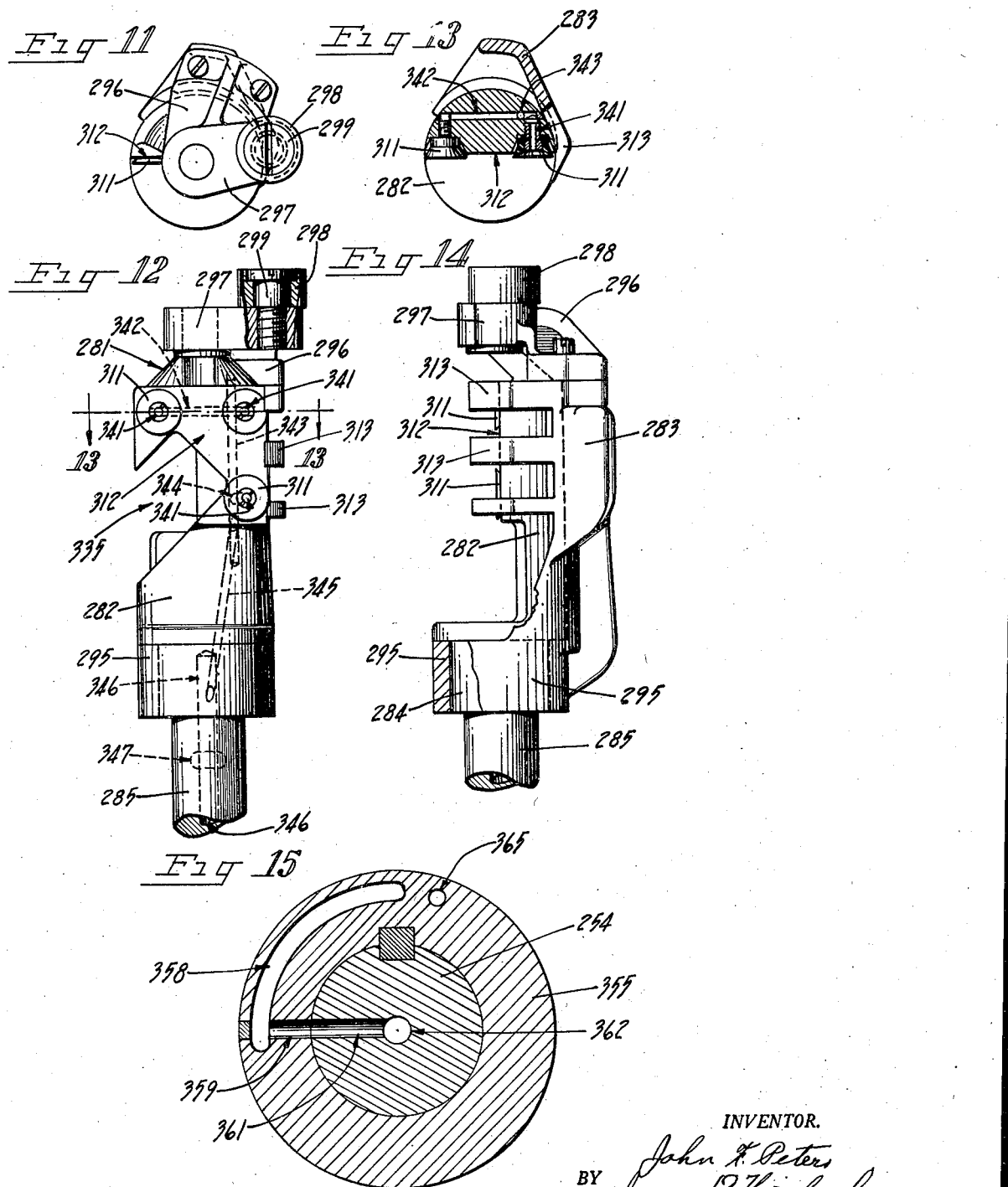

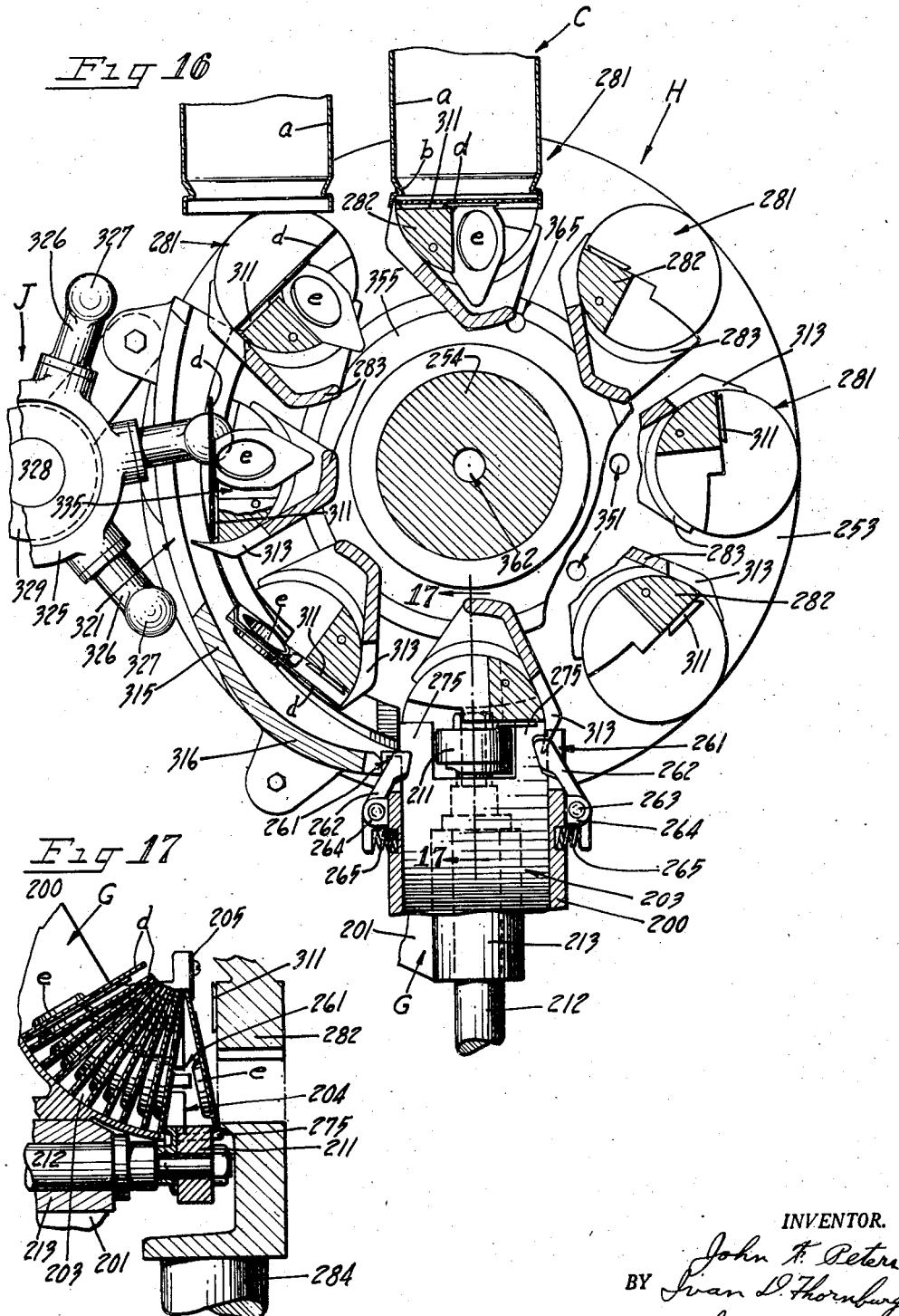

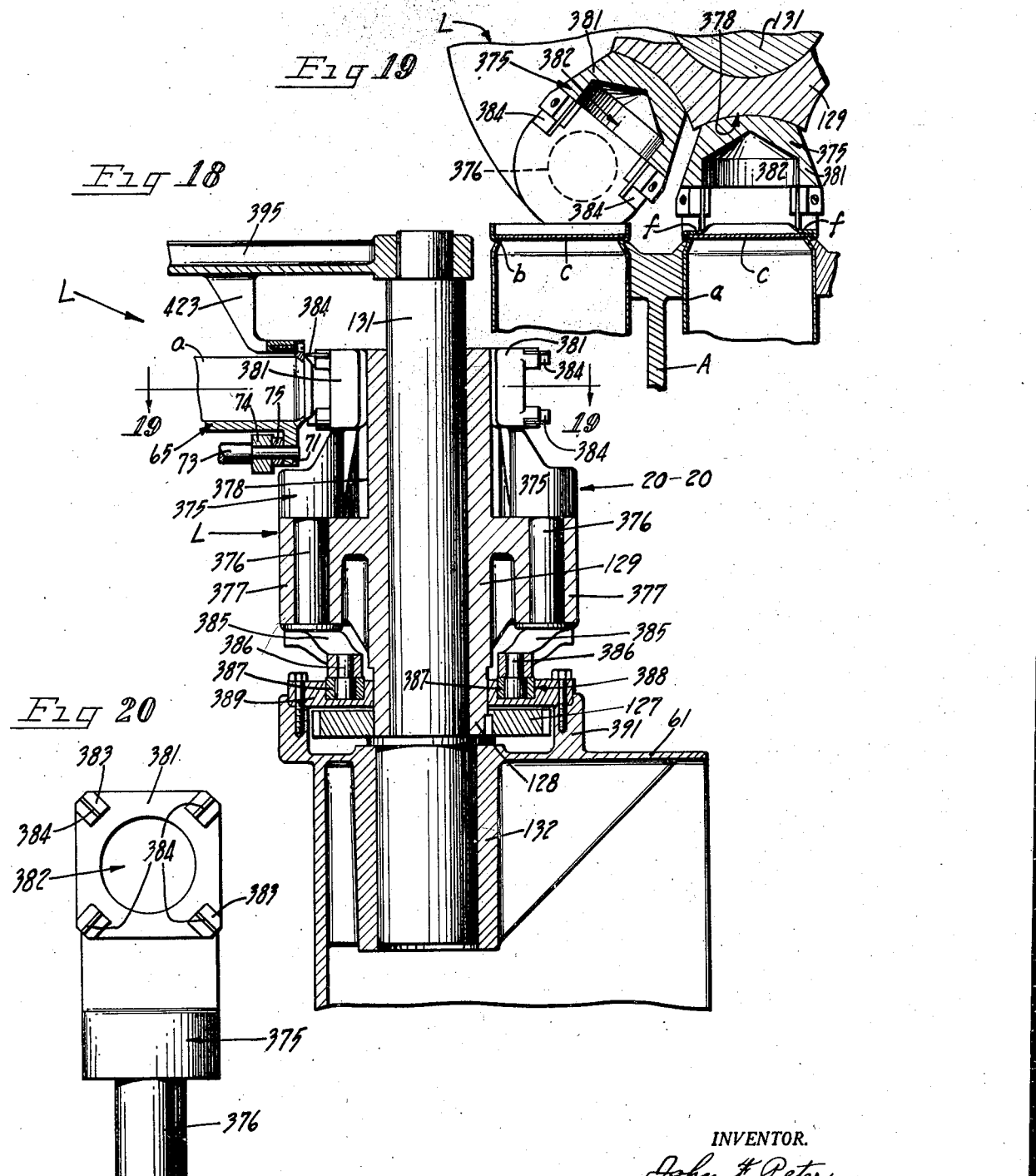

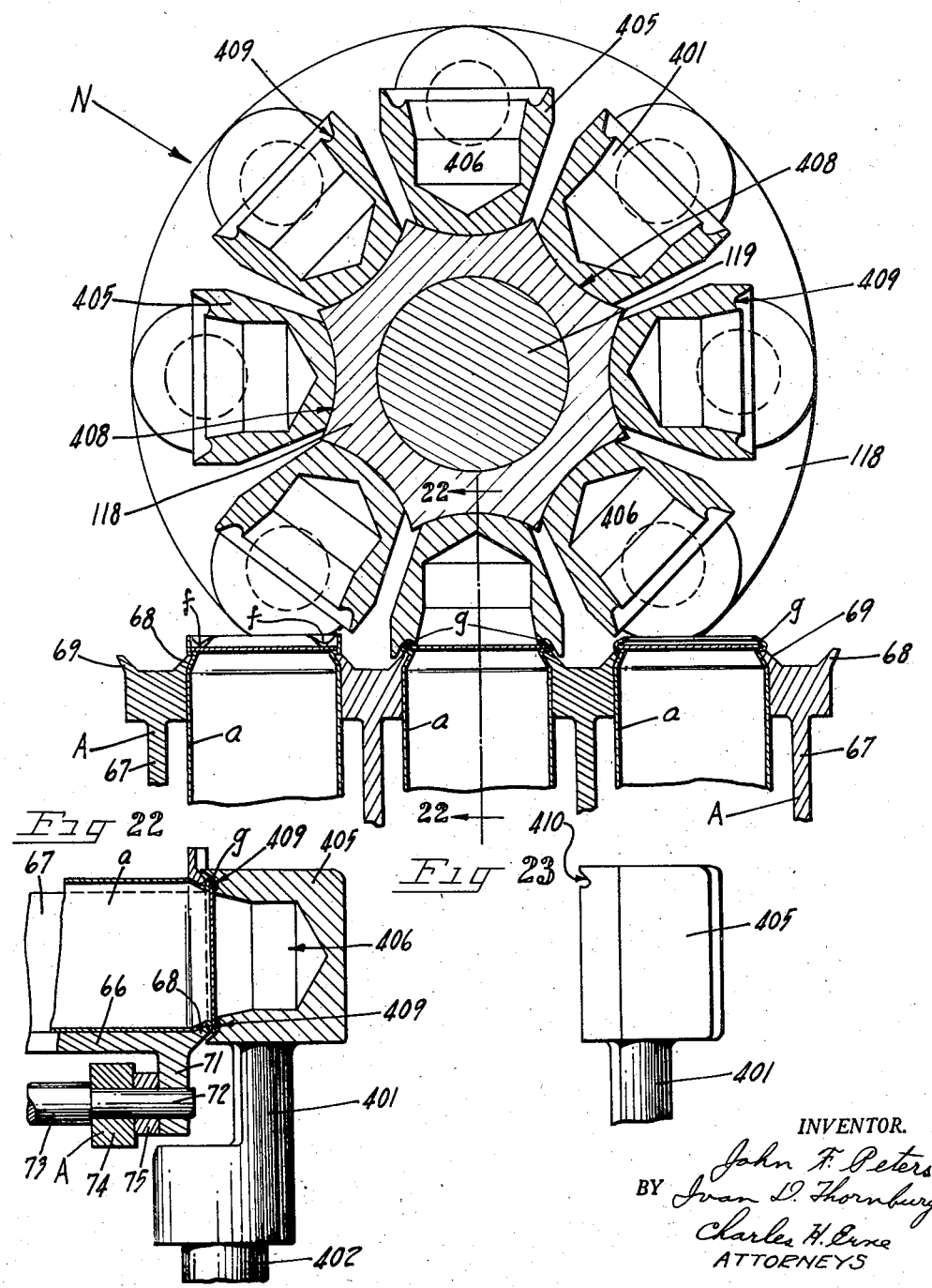

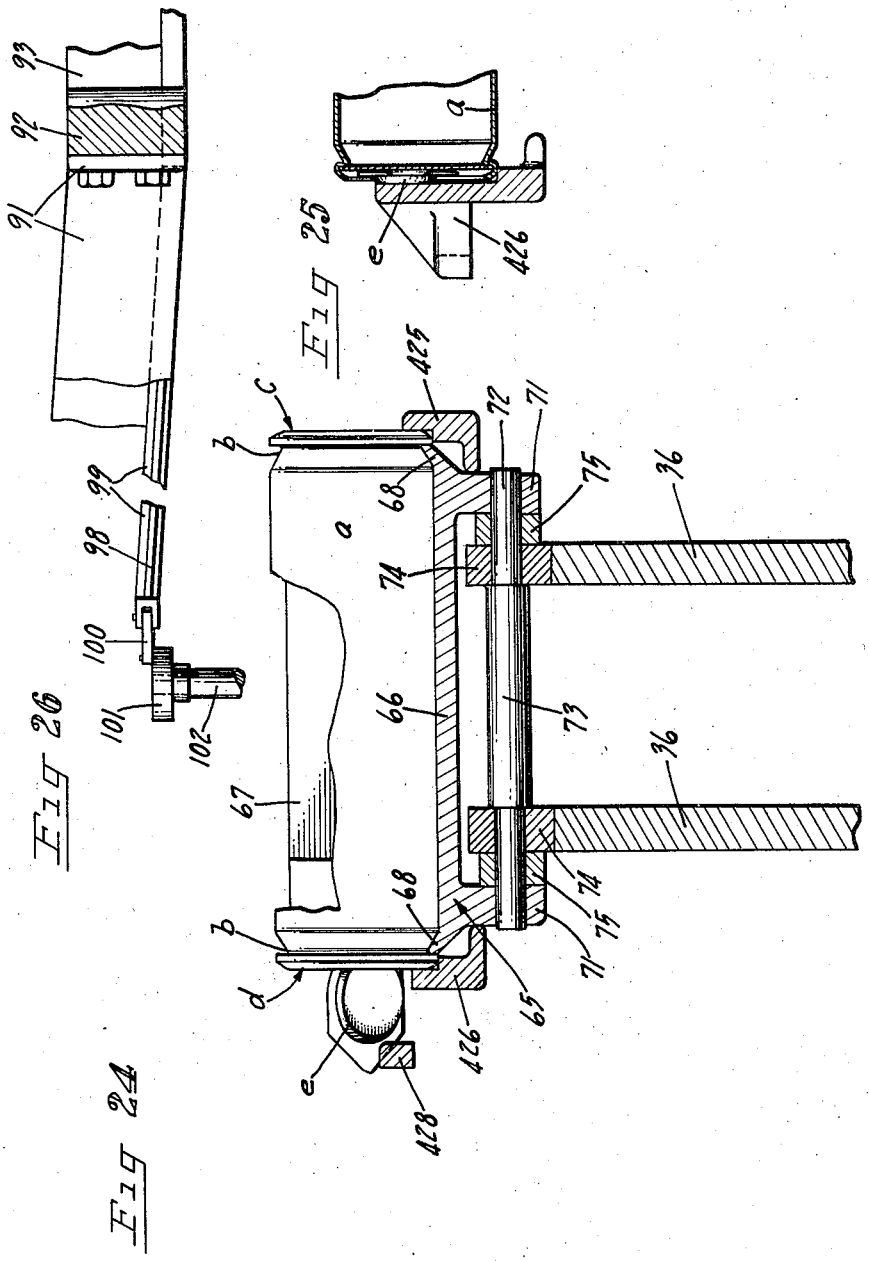

Patented Apr. 30, 1946

2,399,250

UNITED STATES PATENT OFFICE 2,399,250

CAN END ASSEMBLING MACHINE

John F. Peters, Leonia, N. J., assignor to American Can Company, New York, N. Y., a corporation of New Jersey Application February 25, 1943, Serial No. 477,123

15 Claims. (Cl. 93—55.1)

The present invention relates to an apparatus for making a tubular fibre can by assembling fibre ends and a formed tubular fibre body and has particular reference to an apparatus for automatically feeding top and bottom ends into assembled positions within the body, for tucking in corners of the body to hold the ends in place and for bending adjacent parts of the body wall into end seam joints to produce the finished can.

The apparatus disclosed in the drawings and described herein is adapted for use in the manufacture of fibre containers and the container illustrated in the Hothersall Patent 2,085,979, issued by the United States Patent Office on July 6, 1937, has been chosen to exemplify a type of container the manufacture of which is adapted to treatment herein described and claimed.

An object of the invention is the provision of an apparatus for treating formed tubular bodies having inwardly projecting beads adjacent both ends of the body by advancing the body without interruption through a series of operating stations at each of which stations mechanism is arranged for automatically assembling bottom and top ends with the body in such a way as to seat the ends on the inwardly projecting beads, following which a body section outside of the beads and outside of the seated ends first is tucked in at the corners to hold the ends in assembled position and then the body edges are bent inwardly and pressed down to squeeze the ends between the bent and beaded body sections in end seam joints.

Another object of the invention is the provision of a continuously operating conveyor having can body pockets into which fibre can bodies are received and retained during passage through the operating stations, certain parts of the conveyor pockets cooperating with mechanism at the operating stations for assembling the ends and the body and for forming the end seams therebetween.

Numerous other objects and advantages of the invention will be apparent as it is better understood from the following description, which, taken in connection with the accompanying drawings, discloses a preferred embodiment thereof.

Referring to the drawings:

Fig. 4 is a transverse vertical sectional view on an enlarged scale as taken along the section line 4—4 in Fig. 1;

Fig. 5 is a plan sectional view taken along the section line 5—5 in Fig. 4 and drawn to the same scale as Fig. 1;

Fig. 6 is a plan sectional view drawn to an enlarged scale as taken along the line 6—6 in Fig. 4 and showing feeding of the bottom end;

Fig. 7 is a perspective detail of a part of the top end feeding mechanism;

Fig. 8 is a transverse vertical section taken along the line 8—8 in Fig. 6 and showing a part of the bottom end feeding mechanism;

Fig. 9 is a vertical sectional detail as viewed along the line 9—9 in Fig. 6;

Fig. 10 is a sectional detail of parts of the mechanism used in feeding a top end member;

Fig. 11 is a plan view of one of the top end member assembling units, the view being taken from a position indicated by the line 11—11 in Fig. 4;

Fig. 12 is a front elevation of the unit shown in Fig. 11;

Fig. 13 is a horizontal sectional detail taken along the line 13—13 in Fig. 12;

Fig. 14 is a side elevation of the unit illustrated in Fig. 12;

Fig. 15 is an enlarged detail in horizontal section of an air valve associated with the top end assembling unit as viewed along the section line 15—15 in Fig. 4;

Fig. 16 is an enlarged plan section as viewed along the section line 16—16 in Fig. 4;

Fig. 17 is a vertical sectional view taken along the line 17—17 in Fig. 16;

Fig. 18 is an enlarged vertical sectional detail taken along the line 18—18 in Fig. 1 and showing a treating step as applied to the assembled can body and bottom end;

Fig. 19 is a fragmentary plan view, partially in horizontal section, taken substantially along the line 19—19 in Fig. 18;

Fig. 20 is a fragmentary face view in side elevation taken on an enlarged scale as viewed from the position 20—20 in Fig. 18;

Fig. 21 is a plan sectional view drawn to an enlarged scale as taken through a treating mechanism for the assembled can body and bottom end, the section line 21—21 in Fig. 3 indicating the kind of section but being applied to duplicate mechanism for the assembled body and top end;

Fig. 22 is a transverse vertical sectional detail taken along the line 22—22 in Fig. 21;

Fig. 23 is a side elevation of a portion of the mechanism illustrated in Fig. 22;

Fig. 24 is a vertical sectional detail drawn to an enlarged scale as viewed along the section line 24—24 in Fig. 1;

Fig. 25 is a vertical sectional detail drawn to an enlarged scale as taken along the line 25—25 in Fig. 3; and Fig. 26 is a side elevation partially broken away and drawn to an enlarged scale as viewed along the line 26—26 in Fig. 1.

Figure 1:
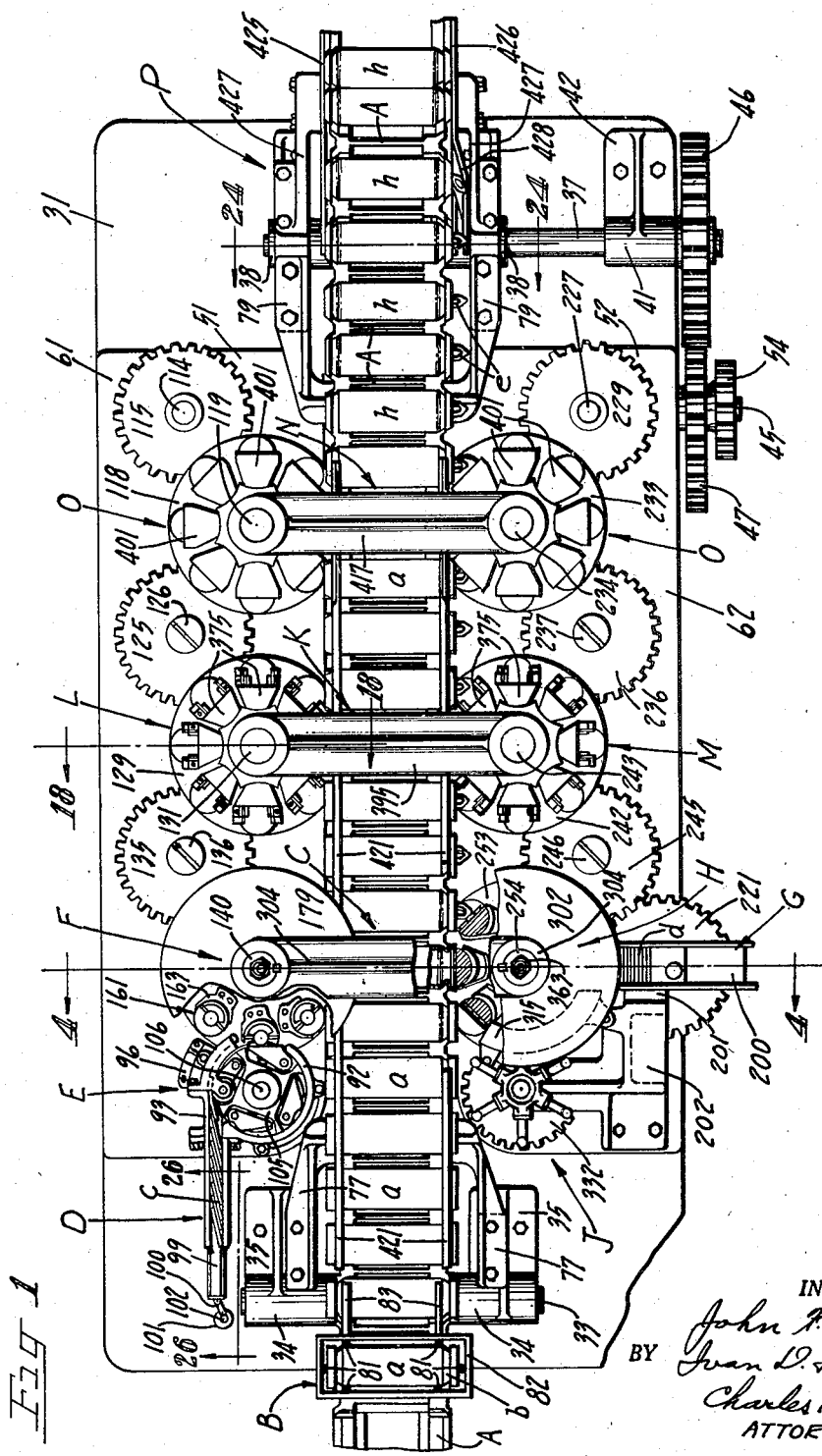
Figure 1 is a plan of an apparatus embodying the present invention with parts broken away.

The apparatus disclosed in the drawings comprises a continuously operating endless conveyor A (Figs. 1, 2 and 3) which is carried between spaced sprockets mounted on horizontal shafts. This mounting insures that an upper run of the conveyor A moves along a horizontal working plane and back through a horizontal return plane.

Such a conveyor A consists of a series of linked can body molds and adjacent molds cooperate, when the conveyor is passing into and along its horizontal working run, to provide conveyor pockets for receiving and holding formed can bodies $a$. Such can body molds when passing over the sprockets open up and cease to function as can receiving and holding pockets.

The can body $a$ is dropped into a conveyor pocket just as the pocket is coming into its upper working run position. A can body chute magazine B is located over the conveyor at the feed-in end of this upper run section and can bodies in vertical stacked formation constitute a can body supply for the moving conveyor.

Reference has been made to conveyor A having body retaining molds. The can bodies $a$ at both ends of the body have inwardly projecting beads $b$ (best shown in Fig. 24) which fit more exactly the molds of the conveyor pockets so that the bodies when presented for treatment at various operating stations are held firmly against longitudinal as well as lateral displacement. This will be referred to again in more detail as the description proceeds.

A can body $a$ when received in the conveyor pocket is brought into the first operating station which is an assembling station C. In the assembling station the body receives a bottom end $c$ and top end $d$. Both bottom and top ends are brought into station C by automatic feed devices and these will be considered at this time.

The bottom end $c$ consists of a flat fibre disc and in the present embodiment of the invention which illustrates a rectangular can body $a$ having a square cross section, this bottom disc is square. A supply of bottom ends $c$ is retained in stacked formation on a bottom end feed device generally indicated at D in Figs. 1, 6 and 26. This stack of bottom ends is retained in a position slightly inclined from the horizontal. A single bottom end is picked out of the feed device D by a bottom transfer unit E which in turn transfers the bottom end into a bottom inserting unit F located in the assembling station C.

The top end $d$ consists of two parts, a main square disc and on this is hinged a closure plug $e$ (Figs. 16 and 17). The closure plug is stapled to the end and in one position closes a dispensing opening cut in the end wall and in another position this dispensing opening is free or uncovered. This particular style of top end is fully described in the aforementioned Hothersall patent.

The top end $d$ is fed from a magazine G (Figs. 1, 4, 16 and 17) which is inclined slightly from the vertical and in this magazine the ends are retained in stack formation and constitute a supply of tops. While in the magazine the closure plug $e$ of the top end $d$ is in closed position. A single top member $d$ is picked off of the bottom of the stack by a combined top feeding and inserting unit H. This unit is located in the assembling station C and is on the opposite side, that is the front, of the machine from the bottom inserting unit F which is at the rear.

During the time a top end $d$ is being brought from the magazine G into an assembled position, it passes a closure plug opening device J. This opening device functions to press the closure plug $e$ out of the dispensing opening and hinges it back into the open position. The top end thereupon remains open as it is inserted into the can body $a$ in the assembling station C.

Both bottom and top ends $c$ and $d$ are inserted simultaneously into opposite ends and against the inwardly projecting beads $b$, of the moving can body $a$. This is done by the inserting units F and H at the assembling station C. This station C is the first operating station. The second operating station is a creasing station K (Fig. 1) in which is located a bottom end corner creasing unit L (Figs. 18, 19 and 20) and a top end corner creasing unit M. The creasing units L and M are identical in style and operation and act upon the two terminal edges of the can body $a$ outside of the end members $c$ and $d$ to form corner tucks $f$ (Figs. 19 and 21). These corner creases constitute the beginning of a bending operation and hold the end members in inserted position preparatory to the further treatment of the can.

Figure 3:
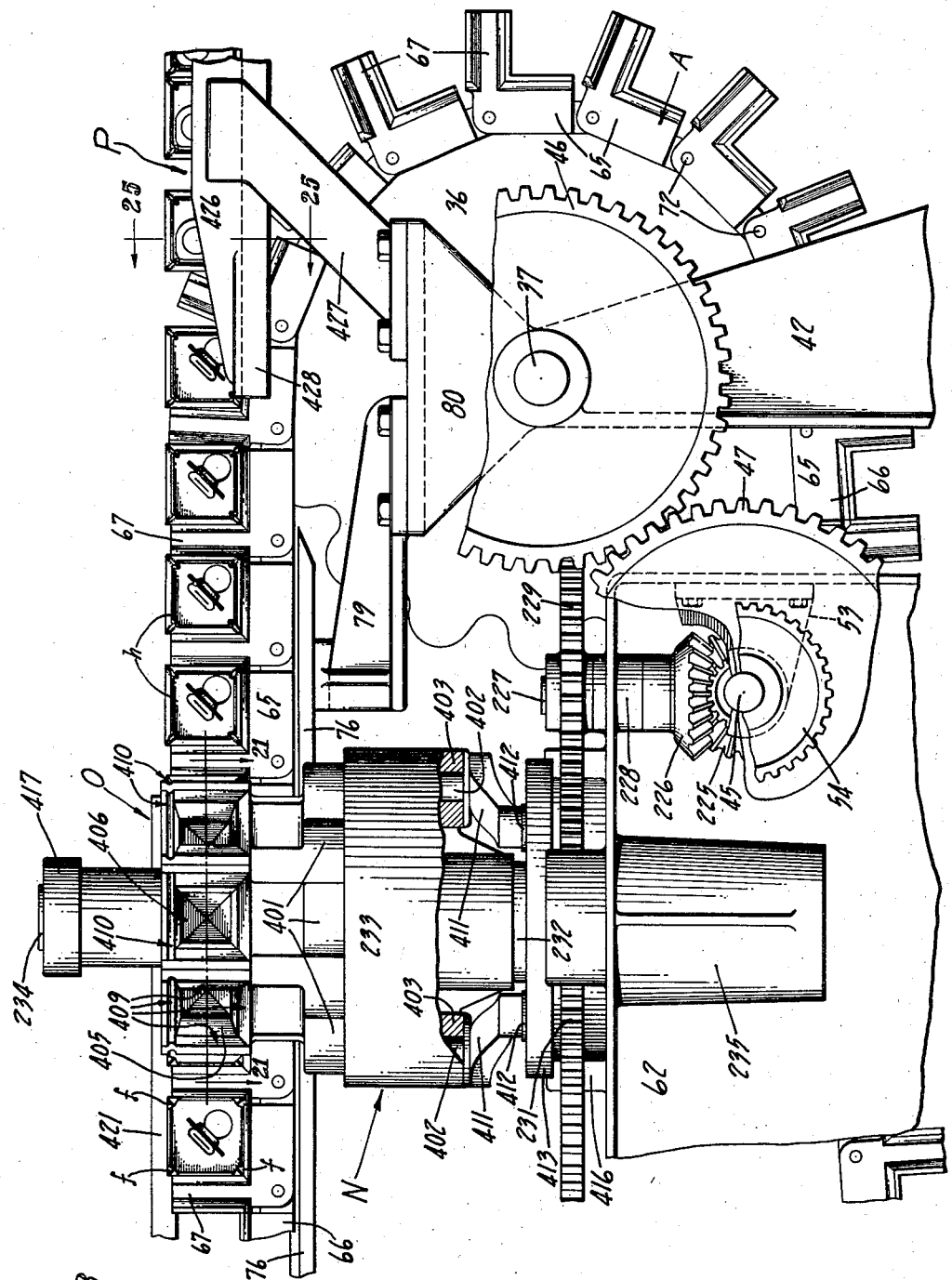
Fig. 3 is a similar enlarged view of the rear end of the machine with parts broken away.

The assembling of the can body with its two ends and the corner creasing of the edges of the can body taking place at the respective operating stations C and K take place while the can body is continuously advancing with the conveyor A. Following the creasing operation at station K, the can body with its tucked-in corners and with its inserted end members passes through the third operating station which is a bending station N (Figs. 1 and 3).

At station N both edges of the can body $a$ are simultaneously bent in to form an end seam joint $g$ (Figs. 21 and 22). This joint forming operation is performed by body bending and joint seaming mechanisms O at station N, one each being arranged on opposite sides of the conveyor. The mechanism O for the bottom end of the can is identical in construction and operation to that of the top end seam forming mechanism and the bending operation takes place upon the can body as it continues its advancement with the conveyor A.

This completes the treatment upon the can body and ends in the present machine. At the end of the horizontal working run of the conveyor A, the formed can (designated by the letter $h$) is brought into a discharge station P (Figs. 1, 3 and 25). The can $h$ passes through the discharge mechanism at station P and out of the present machine being then ready for further treatment such as paraffining or any other desired operation.

Working parts of the present machine are carried on a base 31 (Figs. 1 and 5) which extends through the length and width of the apparatus. The conveyor A at the body receiving end passes over a double sprocket 32 (Figs. 2 and 4) which is mounted on a horizontal shaft 33. The shaft 33 is journaled in bearings 34 formed in a pair of brackets 35 (Figs. 1, 2 and 5) bolted to and supported upon the base 31.

At the body discharge end the conveyor A passes over a double sprocket 36 (Figs. 3 and 5) which is secured to a horizontal shaft 37. Shaft 37 is journaled in bearings 38 formed in the top of a pair of brackets 39 and these brackets are bolted to and supported upon the base 31. The shaft 37 in addition to bearings 38 is journaled in a bearing 41 carried on a bracket 42 also bolted to the base 31.

The shaft 37 is rotated from a drive shaft 45 disposed parallel thereto and through the intermediacy of meshing gears 46 and 47 secured to the respective shafts 37, 45. The drive shaft 45 is journaled in bearings 48 and 49. Bearings 48 are formed in a rear casing 51 and in a front casing 52, which casings may be an integral part of the base 31. Bearings 49 are formed in brackets 53 which are bolted on the inside end walls of the respective casings. The drive shaft 45 may be rotated in any suitable manner as by application of power applied through a gear 54 which is mounted on the front end of the shaft adjacent the gear 47.

The rear casing 51 provides a housing and a support for the mechanisms D, E, F, L and O which operate upon the bottom ends of the can. At the top, the casing is formed into a horizontal table section 61 (Figs. 4 and 5) and it is on this table that the various bottom end mechanisms are carried at the operating stations C, K and N. In a like manner, the front casing 52 provides a housing and a support for the mechanisms G, H, J, M and O which operate upon the top ends of the can. Casing 52 at its top is formed into a horizontal table section 62 which provides support and bearings for the various top end mechanisms. Both the upper working run and the lower return run of the conveyor A pass between the rear and front casings 51, 52.

Conveyor A is made up of a plurality of can receiving body saddles 65 (Figs. 2, 4 and 24) each of which is formed with a base wall 66 and a side wall 67 at right angles to the base wall. Centrally of the saddle the walls 66 and 67 are flat but to the front and rear of the machine the inside of each wall is projected laterally and inwardly into spaced inclined ridges 68. Thus these ridges are formed on the inside of both walls and are at both ends of the saddle in such a manner as to provide a right angled corner projection at each end. These corner ridges are adapted to fit snugly into the beads $b$ of a can body $a$ along two adjacent sides when the body is locked in a pocket of the conveyor. Fig. 24 illustrates this locked position. This is what is meant by referring to the conveyor pockets as can receiving molds.

Figure 2:
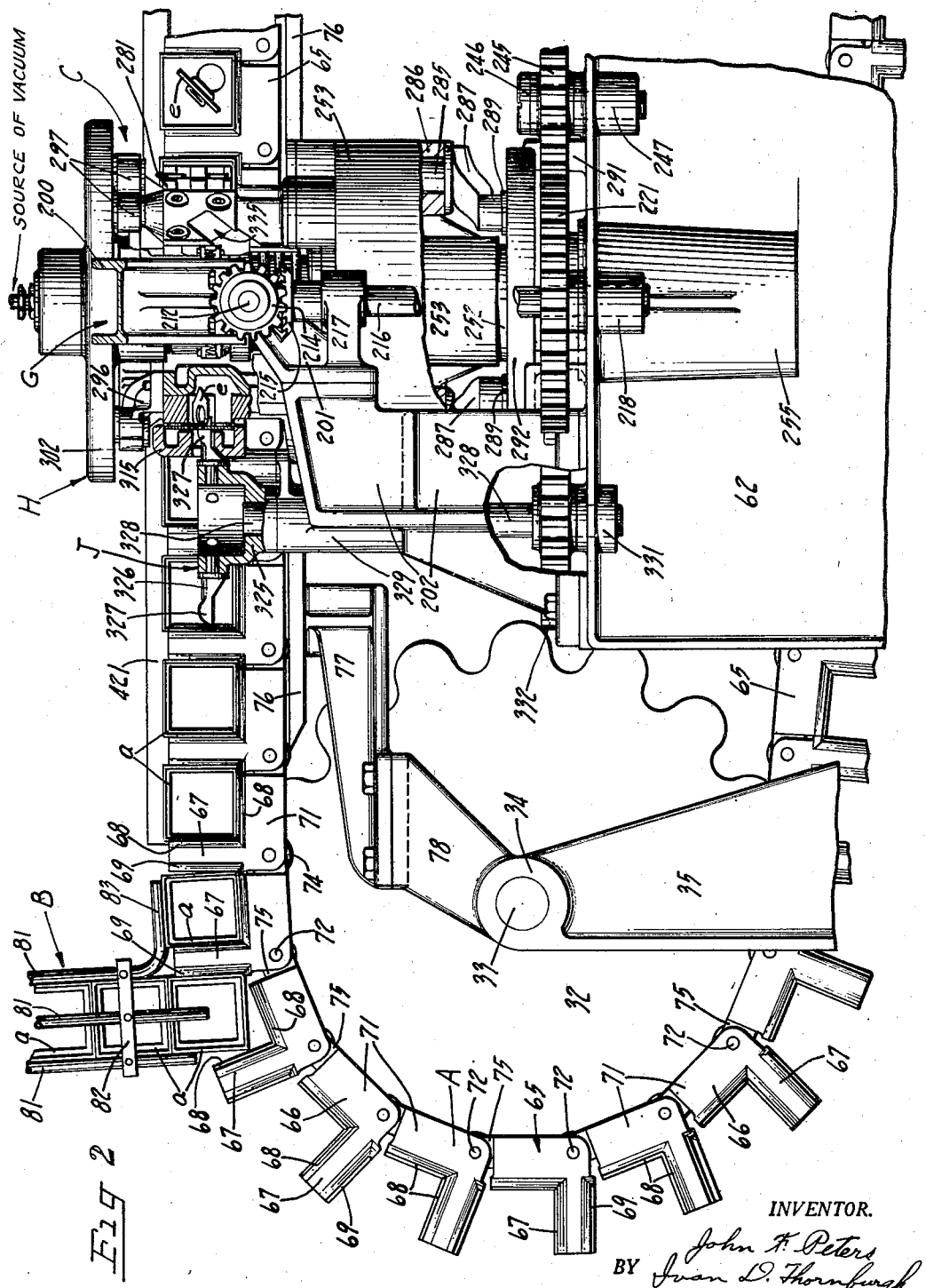
Fig. 2 is an enlarged side elevation of the forward end of the machine with parts broken away.

The side wall 67 at the rear, that is opposite the ridges 68, and at both front and rear of the machine, also is projected out into a pair of spaced straight ridges 69. These ridges are of the same shape in cross section as the ridges 68. When a can body is being locked in a conveyor pocket, the side wall part 69 of the ridge 68 of one saddle 65 moves up parallel to the straight ridge 69 of the next preceding saddle. This takes place after the conveyor A brings the rear saddle onto its upper straight run. This is best illustrated in Fig. 2 at the top of the conveyor and to the right of the magazine B.

This coming into parallelism does not take place until after the lowermost can body $a$ is fully received into the conveyor pocket after dropping out of the bottom of the magazine. At the time a body enters the conveyor the forward side of the body moves along the straight ridges 69 of the saddle ahead and it is not until the can body has moved laterally of the magazine that the right angled ridges 68 of the succeeding saddle come into place in the beads $b$ on the bottom and rear of the body. When the pocket is closed it will be seen that the can body is securely held against displacement from three sides and is prevented from shifting laterally of the pocket by the interlocking of the ridges 68 and 69 into the body beads.

Each saddle base wall 66 is recessed in the center leaving two spaced side walls 71. The two walls 71 carry a shaft 72 which extends across the recess at the rear of the saddle considering its movement along the conveyor course. Shaft 72 is enlarged in the center, as at 73, to provide a spacer member for sprocket rollers 74 which are loosely mounted on the shaft.

In the front the base wall of each saddle 65 is projected forward in two spaced lugs 75 and these lugs extend over and pivotally connect with the shaft 72 of the adjacent preceding saddle. In other words, the saddles 65 are formed as links in the chain which constitutes the conveyor A, there being two adjacent shafts 72 for each saddle pocket. The double sprocket 32 and also the double sprocket 36 are formed and are spaced to provide seats for the rollers 74 as the various saddles pass over the sprockets. This is a well known construction in roller chain design and is fully illustrated in Figs. 2, 3 and 24.

The conveyor A is supported against sagging on its upper working run by grooved tracks 76 (Figs. 2, 3 and 4) which extend between the sprockets 32, 36. For this purpose there are two parallel tracks. At the entrance end of the conveyor each track 76 is supported upon a bracket 77 (Fig. 2) bolted to an extension bearing 78 which preferably is an integral part of the bearing 34 of each bracket 35. At the forward or exit end of the conveyor A, each track 76 is supported upon a bracket 79 which in turn is bolted to an extension frame 80 formed as an integral part and extending between the bearings 38 of the brackets 39. Such a frame 80 also ties together the two brackets 39.

In this way a solid support is provided for the tracks and as soon as a saddle leaves the sprocket 32 as it begins its upper run, its rollers pass onto the tracks 76. During the movement of each saddle through the operating stations, the upper run of the conveyor chain thus is held taut and the saddles are retained in true container holding position until the rollers leave the tracks 76 and pass onto the sprockets 36. By that time, the work or assembly having been preformed, the conveyor pockets open up preparatory to the can discharge. This insures the proper holding of the can bodies while being conveyed through the machine.

The can body magazine B comprises substantially vertical, spaced rods 81 (Figs. 1 and 2) which are held together by guide straps 82. The rods 81 form guides for a stack of the preformed open ended can bodies $a$ which rest in stack formation within the magazine. When a conveyor pocket comes into can body receiving position as illustrated in Fig. 2, the lowermost body drops down into the saddle and back of the adjacent preceding saddle, as has already been described.

The conveyor continues its movement (toward the right as viewed in Fig. 2) and the lowermost can body is moved laterally out from under the magazine. The body next above is retained in the stack, being so held by the side wall 67 of the saddle which is removing the body then leaving the magazine. Such a body passes beneath laterally extending foot sections 83 formed on or secured to the forward magazine rods 81. This keeps the body down against the base wall of the saddle in which the body rests until the body is fully locked within the conveyor pocket. Each conveyor pocket upon locking a can body in the advancing conveyor thereupon holds and presents the can body to the various working mechanisms at the operating stations.

The bottom end feed D for holding the bottom end members c is best illustrated in Figs. 1, 6 and 26. This unit consists primarily of spaced parallel walls 91 bolted at one side to a casing ring 92 which partially encloses the bottom transfer unit E and on the other side to a spacer plate 93. The casing ring is secured to an upwardly extending semi-circular shell 94 (Figs. 5 and 8) formed on the table 61. This spacer plate 93 is bolted to a channel guide iron 95 which is mounted on top of a bracket 96 (Fig. 6) resting on and secured to the casing table section 61. The guide iron also partially encloses the bottom transfer unit.

The end feed walls 91 extend at a slight angle to the horizontal pitching up slightly from their position of attachment with the parts 92, 93. A slideway extends inside of and along the bottom edge of each wall 91 such slideways being formed by grooves cut in the walls for the reception of side tongues 98 formed on a bottom slide plate 99. The upper end of plate 99 is connected to a link 100 which in turn pivotally connects with a crank disc 101 which is carried at the upper end of a vertical shaft 102. The shaft 102 extends up from and is journaled in suitable bearings formed in the base 31. Shaft 102 is rotated in any suitable manner so that the slide plate 99 slides in and out relative to the parallel walls 91.

The bottom ends c are stacked in slightly inclined but nearly horizontal position on edge and are retained in stacked form between the parallel walls 91. The space between the walls 91 is not sufficient for the full width of a bottom end and the stack therefore is flared out as seen from above and is disposed at an angle, as best shown in Fig. 6. By reason of the resulting agitating sliding movement and the supporting effect of the plate 99, the ends c are urged toward the right as they are fed toward the bottom transfer unit E. This transfer unit operates upon the foremost edge of the forward bottom end c in the stack and withdraws each end individually, thus transferring the end from the feed unit D. The bottom transfer unit E will now be considered.

Bottom transfer unit E may be of the type illustrated in my United States Patent 2,303,385, issued December 1, 1942, and comprises a turret 105 (Figs. 6 and 8) which is mounted on the upper end of a vertical shaft 106. This shaft is journaled in a bottom bearing 107 formed in the table section 61 and in an upper bearing 108 formed in a bracket 109 secured to the inner face of the casing ring 94. Just above the bearing 107 and above the surface of the table 61 the shaft 106 carries a spur gear 111 by means of which the shaft and the turret are rotated without interruption during the operation of the machine.

Rotation of gear 111 is effected through a gear train leading from the drive shaft 45 as best shown in Fig. 5. Drive shaft 45 carries a bevel gear 112 which meshes with a similar gear 113 mounted on a short vertical shaft 114. Shaft 114 is journaled in a bearing formed in the table section 61. A spur gear 115 is secured to the shaft 114 just above its bearing and is so located as to be in the same plane as the gear 111 and other gears intermediate thereto.

The gear train which connects gear 115 with gear 111 includes a gear 116 which meshes with the gear 115. Gear 116 is keyed to the lower end of a sleeve 117 which is an integral part of a turret 118 (Fig. 21) for one of the seaming mechanisms O at the bending station N. This turret 118 rotates on a vertical stationary shaft 119 held in a suitable bearing formed in the table section 61.

The gear 116 also meshes with an idler spur gear 125 (Fig. 5) mounted on a shouldered stud 126 which is screwed to the table 61. Rotation of the idler gear 125 is transmitted to a spur gear 127 which meshes therewith. Gear 127 is keyed to the lower end of a sleeve 128 (see also Fig. 18) which is an integral part of a turret 129 of the bottom corner creasing unit L at the creasing station K. This turret 129 rotates on a vertical stationary shaft 131 which is held in a suitable bearing 132 formed in the table section 61.

The gear 127 also meshes with an idler spur gear 135 (Fig. 5) mounted on a shouldered stud 136 which is secured in the table 61. Rotation of the idler gear 135 is transmitted to a spur gear 137 which meshes therewith. Gear 137 is keyed to the lower end of a sleeve 138 (Fig. 4) which is an integral part of a turret 139 of the bottom inserting unit F at the assembling station C. This turret 139 rotates on a vertical stationary shaft 140 held in a bearing formed in the table section 61. Gear 137 meshes directly with the gear 111 in the bottom transfer unit E, thus completing the gear train.

The turret 105 (Figs. 6 and 8) is cut away in its upper face to provide pockets 141 and in each pocket a feed shoe 142 is pivoted on a pin 143 carried in the turret. These pockets are opened along the periphery of the turret. The outer face of each feed shoe is recessed at 144 for the reception of a resilient band unit.

Each band unit comprises a curved plate 145. This plate is surrounded by an endless rubber or other resilient band 146. The plate and band constitute a removable band unit and such a unit is adapted to fit into and to be secured within the recess 144 of a feed shoe 142. Screw 147 and 148 may be used to hold the band unit in the feed shoe.

When the feed shoe is in its outer pivoted position the outer convex wall of the band 146 extends just beyond the periphery of the turret 105. It is yieldably held in this extended position by a spring 149 interposed between the feed shoe and an adjacent wall of the feed shoe pocket 141, both walls being counterbored to form seats for the spring.

The constant reciprocation of the bottom slide plate 99 of the bottom end feed D aided by its slight incline to the horizontal, keeps the stack of bottom ends c pressed over toward the transfer turret 105. As a feed shoe 142 sweeps across the mouth of the magazine space between the walls 91, the forward bottom end c of the stack is frictionally engaged by the outer wall of the rubber band 146 under the yielding pressure of its spring 149 and is swept from the stack, as shown in Figs. 6 and 8.

As this cut-out bottom end c slides from the stack it is brought into the inside channel of the guide channel iron 95 and is guided by this channel member into the bottom inserting unit F at the assembling station C. The width of the bottom end is greater than the contacting rubber band 146 of the feed shoe 142 and where the top of the advancing end projects above the shoe and above the turret 105, it passes over an idler roller 151 spaced inwardly from the concave wall of the channel iron. Roller 151 is loosely mounted on a headed stud 152 which is threadedly engaged in an overhanging lug 153 formed on the channel iron. This assists in guiding the bottom end and also assists in springing the end to the curvature required for its passage through the channel iron.

The bottom inserting unit F (Figs. 4 and 6) includes the turret 139 which revolves on the stationary shaft 140. This turret carries a plurality of end inserting heads 161, the drawings showing eight such heads. One head receives one bottom end from its feed shoe 142 and since there are four feed shoes the transfer turret 105 makes two revolutions for each revolution of the inserting turret 139 carrying its eight inserting heads.

Each inserting head 161 is formed as a double unit consisting broadly of an inner part 162 and an outer part 163. These parts have independent oscillation on the same vertical axis in addition to being carried bodily around the shaft 140 with the revolving turret 139. Each part is cam controlled so that the cut-out bottom end $c$ being carried around by its feed shoe 142 will be met by an inserting head in a proper position for transfer and the head picking off the can end then will insert it gently into the can body $a$ as the cam controlled inner and outer parts move into the proper and correct position.

The inner head part 162 of each inserting head 161 at its bottom end is formed in a cylindrical boss 164 which is mounted on and is secured to the upper end of a vertically disposed spindle 165. Each spindle 165 is journaled in a sleeve 166 formed as an integral part of the turret 139. At the bottom the spindle carries an arm 167 the outer end of which holds a pin 168 on which a cam roller 169 is rotatably mounted.

The gear 137 is surrounded in part by an upstanding circular wall 171 which is an integral part of the table 61. A circular face cam 172 is mounted on and is secured to the wall 171 and forms a ceiling for a chamber enclosing the gear 137, two sides of the chamber where the gear 137 meshes with gears 111 and 135 being open. A cam groove 173 is formed in the upper face of the cam and the cam rollers 169 of the eight inserting heads traverse and operate in the cam groove. This effects the desired oscillation of the inner part 162 of the inserting head 161.

The outer head part 163 of each inserting head 161 is formed at the bottom in a sleeve section 174 which encircles the boss 164 of the inner part. Head part 163 at the top carries a bracket 175 which is secured thereto. This bracket extends up over the center of the spindle 165 and then extends laterally in an arm 176. This arm at its end carries a cam roller 177. The roller 177 of each inserting head is adapted to traverse a cam groove 178 formed in the lower face of a stationary cam 179.

Cam 179 is mounted on top of the stationary shaft 140 and is keyed to the shaft as at 181. This construction insures that the cam 179 remains stationary while the cam rollers 177 of the eight outer inserting head parts traverse the cam groove 178. In this manner the outer head part is oscillated in proper time to effect the receipt of a bottom end $c$ from the transfer device or unit E and the insertion of the end in a can body $a$.

Each inner head part 162 (Figs. 4 and 6) carries four suction cups 185 which are mounted on a vertical wall 186 of the inner head. As the inserting head approaches the position where it is to receive a bottom end $c$, this inner head part 162 is moved on the vertical axis of the head so that all four suction cups will engage the end simultaneously, preparatory to pulling it off of the feed shoe 142.

As soon as the end $c$ is picked up by the suction cups, the outer head part 163 is shifted on the vertical center of the head through the medium of its cam device and this advances a circular projecting finger 187 so that the finger moves in back of the end. This insures against any slipping of the end relative to the suction cups. The finger 187 is integral with the outer head part and functions as a shoe horn to gently seat the end $c$ into the end of the can body $a$.

Suction for the suction cups is valve controlled and for this purpose suitable ducts and passageways lead from each cup into the center of each spindle 165. In one position of the spindle a lateral port extending from the center of the spindle to the outside communicates with a horizontal passageway 191 formed in each turret sleeve 166. A port 192 extends vertically to the top surface of the turret 139, such a port being located near the inner end of each passageway.

This port 192 is closed or opened as the turret revolves around the shaft 140, this being effected by a disc valve 193 which surrounds the shaft and is feathered to it. Valve 193 is yieldably pressed into airtight engagement with the flat surface at the top of the turret 139 by a spring 194 which surrounds the shaft and which is backed up by a collar 195 pinned onto the shaft.

Valve 193 is provided with suitable channels and passageways so that when suction is applied to the suction cups air is removed from the cups through the valve and by way of a central port 196 formed longitudinally in the upper end of the shaft 140. This port terminates at the top end of the shaft and a suction pipe 197 connecting with the port leads to a suitable source of vacuum, such as a pump or a vacuum tank (not shown).

It is thought that the foregoing description is sufficient to briefly explain the operation of the suction cups 185 and to give an idea of the construction of the inserting head units 161. These units are substantially of the same construction as corresponding parts in the top feeding and inserting unit H and more detailed illustration and description will be given when this latter unit is taken up hereinafter.

After the inserting head has received a bottom end $c$ from the transfer shoe 142, the turret moves through 90 degrees to bring the suction held end into a position where it is inserted into the can body $a$ at the assembling station C. As best illustrated in Fig. 6, the forward edge of the held bottom end $c$ is first inserted into the forward wall part of the can body, toward the right as viewed in this figure, so that the end is brought near to the body bead $b$ by a suitable rocking of the inner head part 162 to the left or in a counter-clockwise direction, also as viewed in Fig. 6. The head part 162 of the inserting head 161 which is moving adjacent the left-hand can body as shown in this figure is first rocked in a clockwise direction by action of the cam groove 173 of the cam 172 acting on the roller 169 for this particular inserting head. Thereupon as the inserting head and can body move closer together in their continued advancement (toward the right) the leading edge of the bottom c enters into the end of the can body a and as both bottom and body advance the head part is shifted back in a counter-clockwise direction to overcome the slight angular difference between bottom and body and to bring the bottom parallel to and to fully seat it on the body bead b. This fully inserted position is shown in the right hand or advanced body a of Fig. 6. Thus the bottom c is squarely inserted into the end of the can body as the body passes the center line of the turret shaft 140 at right angles to the advancement of the can body.

Following this action and without any interruption in the advancement of either the can body a or the bottom end c the inserting head part 162 is rocked back so that the inserted end is not disturbed and will not be drawn from its inserted position. At the same time suction is cut off from the suction cups and air is admitted to the cups to break the vacuum. This operation is performed through the disc valve 193 by way of a vent port 198 extending vertically through the stationary valve, the vent port at such time aligning with the vertical port 192 in the turret 139.

At the time that the bottom end c is inserted into one end of the can body a, the top end d is also inserted in the other or opposed end of the can body. The feeding of the top end into assembling position within the assembling station C will now be discussed.

The magazine G (Figs. 1, 2, 4, 16 and 17) comprises an inclined chute 200 which is mounted on a bracket 201. Bracket 201 is bolted to a bracket frame 202 which sets on and is secured to the top of the table section 62. At the bottom end, the chute 200 is formed with a curved floor 203 which terminates adjacent vertical side walls 204. The top ends d are placed in the inclined chute 200 in stack formation. As each top end is removed in the operation of feeding to the top feeding and inserting unit H, the rest of the stack moves down and fills up the circular passage 203.

While in the circular section of the magazine, the ends fan out, as best shown in Fig. 17, and the lowermost end is separated from the stack so that its closure plug section e is free without any nesting of the parts. The movement of the lowermost top end e into its separated or cut-out position is effected by a separating device acting positively in time with the operation of the machine. The upper part of the cut-out end as well as the stack is retained by a plate 205 secured to the vertical wall 204 of the chute 200.

The separating device comprises a drum 211 (Figs. 4, 7 and 17) which is bolted on the end of a horizontal actuating shaft 212. This shaft 212 is journaled in a bearing 213 (see also Fig. 16) formed in the bracket 201. Outside of the bearing 213, the shaft 212 carries a bevel gear 214 (Figs. 2 and 4) which meshes with a similar gear 215, mounted on a vertical shaft 216. Shaft 216 is journaled in a bearing 217 which may be an integral part of the bracket 201 and in a bearing 218 formed in the table top 62.

Just above the bearing 218 the shaft 216 carries a spur gear 221 (Figs. 2 and 5). The separating device operates continuously in its position beneath the stack of top ends d and rotation is imparted to shaft 212 by way of the gear 221 through a gear train from the drive shaft 45. For this purpose the drive shaft carries a bevel gear 225 (see also Fig. 3) which meshes with a similar gear 226 mounted on a short vertical shaft 227. Shaft 227 is journaled in a bearing 228 formed in the table section 62. A spur gear 229 is secured to the shaft 227 just above its bearing and is so located as to be in the same plane as the gear 221 and other gears intermediate thereof.

The gear train which connects gear 229 with gear 221 includes a gear 231 which meshes with the gear 229. Gear 231 is keyed to the lower end of a sleeve 232 which is or may be an integral part of a turret 233 for one of the seaming mechanisms O at the bending station N. This turret 233 rotates on a vertical stationary shaft 234 which is held in a suitable bearing 235 formed in the table section 62.

The gear 231 also meshes with an idler spur gear 236 mounted on a shouldered stud 237 which is screwed to the table 62. Rotation of the idler gear 236 is transmitted to a spur gear 240 which meshes therewith. Gear 240 is keyed to the lower end of a sleeve 241 which is an integral part of a turret 242 (Fig. 1) located at the creasing station K.

This turret 242 is a part of the top corner creasing unit M and is identical in construction and operation with the turret 129 of the bottom corner creasing unit L in the creasing station. This mechanism performs the same type of operation on the top end d as is performed on the bottom end c by the bottom corner creasing unit L. Turret 242 rotates on a vertical stationary shaft 243 which is held in suitable bearings formed in the table section 62.

The gear 240 also meshes with an idler spur gear 245 (Figs. 2 and 5) mounted on a shouldered stud 246 which is secured in a bearing 247 formed in the table 62. Rotation of the idler gear 245 is transmitted directly to the gear 221.

The gear 245 also meshes with a gear 251 and this gear is keyed to the lower end of a sleeve 252 (see also Fig. 4) which is an integral part of a turret 253 of the top feeding and inserting unit H at the assembling station C. Turret 253 rotates on a vertical stationary shaft 254 held in a bearing 255 formed in the table 62.

The side walls of the chute 200 (Figs. 16 and 17) in the lower curved section 203 adjacent the wall 204 are slotted at 261. Pivoted stack retaining fingers 262 extend into the chute through certain of these slots. The fingers are spring held and provide yielding holders for the top end d when it is swung out at the bottom by the separating drum 211.

Each finger is pivotally mounted on a pin 263 held in lugs 264 which extend outwardly from the outer surface of the chute walls. A spring 265 for each finger is seated in a countersunk pocket formed in the adjacent chute wall and its opposite end presses outwardly against a tail part of the finger. This insures the desired holding action on a bottom end being separated from the stack.

The drum 211 (Fig. 7) is cut across in an inclined groove 271 and a cut-out disc 272 is mounted on the shaft 212 and is fastened into the outer face of the drum. This disc is formed with a broken or interrupted peripheral rim 273 which terminates at one end in a knife separator 274. The knife separator projects across the front of the groove 271.

As the drum and disc rotate with the shaft 212, the knife separator passes in between the lowermost top end d in the chute and the end next adjacent and cams or prys outwardly the lower edge of the end. This action forces the lower edge into the groove 271 of the rotating drum 211. The edge of the inclined groove thereupon swings the lower edge of the end about the top plate 205 and moves the end beyond the wall 204. Finally at the end of the groove this lower edge of the cut-out top end passes out beyond the drum and then is in the position shown in Fig. 17. The now inclined top end d rests on two spaced extensions 275 of the chute wall (see Figs. 16 and 17). Such a separated end now is ready for removal by the top feeding and inserting unit H.

As previously stated the turret 253 like the turret 139 for the insertion of the bottom end c, carries a number of inserting heads 281 (Figs. 4 and 12). Turret 253 carries eight inserting heads and one head receives one top end d from its inclined position as it rests on the extensions 275 of the chute and as it is held at the top by the plate 205.

Each inserting head 281 is formed with a double unit consisting broadly of an inner part 282 and an outer part 283. These parts have independent oscillation on the same vertical axis in addition to being carried bodily around the shaft 254 with the revolving turret 253. Each part is cam controlled so that the top end when picked off from the bottom of the magazine and carried around will be subjected first to the action of the closure plug opening device J and will then be inserted into the can body a as the cam controlled inner and outer parts move into the correct or proper position.

The inner head part 282 of each inserting head 281 at its bottom end is formed in a cylindrical boss 284 which is mounted on and is secured to the upper end of a vertically disposed spindle 285. Each spindle 285 is journaled in a sleeve 286 formed as an integral part of the turret 253. At the bottom the spindle carries an arm 287 (see also Fig. 2) the outer end of which holds a pin 288 on which a cam roller 289 is rotatably mounted.

The gear 251 for rotating the turret 253 is surrounded in part by an upstanding wall 291 (Figs. 4 and 5) preferably constituting an integral part of the table 62. A circular face cam 292 is mounted on and is secured to the wall 291 and forms a ceiling for a chamber enclosing the gear 251. At two places the chamber is open where the gear 251 engages with other gears. A cam groove 293 is formed in the upper face of the cam 292 and the cam rollers 289 of the eight inserting heads traverse and operate in the cam groove. This effects the desired oscillation for the inner part 282 of the inserting head 281.

The outer head part 283 of each inserting head 281 is formed at the bottom in a sleeve section 295 which encircles the boss 284 of the inner part. Head part 283 at the top carries a bracket 296 which is secured thereto. This bracket extends up over the center of the spindle 285 and then extends laterally in an arm 297 (see also Figs. 11 and 12). This arm at its end carries a cam roller 298 mounted on a stud 299 threaded into the end of the arm. The roller 298 of each inserting head is adapted to traverse a cam groove 301 (Fig. 4) formed in the lower face of a stationary cam 302.

Cam 302 is mounted on top of the stationary shaft 254 and is keyed to the shaft as at 303. Above the cam 302 the shaft 254 is tied to the shaft 140 by a connecting arm 304 which is also keyed to the shaft 254 by the key 303 and to the shaft 140 by the key 181. This construction insures that the cam 302 remains stationary while the cam rollers 298 of the eight outer inserting head parts 283 traverse the cam groove 301. In this manner each outer head part is oscillated in proper time to effect the proper receipt of the top end d from its position at the bottom of the chute 200 as well as to present it in proper position to the closure plug opening device J and also to hold the top end for easy insertion into a can body a at the assembling station C.

Each inner head part 282 (Figs. 12, 13 and 14) carries three suction cups 311 which are mounted on a vertical wall 312 of the inner head. Prior to the inserting head approaching the position where it picks off a top end d, this inner head part 282 is moved on the vertical axis of the head so that the wall 312 is presented squarely to the inclined top end.

Each outer head part 283 is formed with finger extensions 313 which extend ahead of the vertical wall 312 and these finger extensions pass into and through some of the slots 261 in the side walls of the chute 200, as best illustrated in Fig. 16. These finger extensions engage the rear edge of the inclined top end d and sweep it laterally off of its supporting chute parts 275 and carry it around with the advancing turret 253. During this passage of the top end, it is retained against displacement in the inserting head 281 by a circular guide plate 315 (Figs. 1, 2 and 16) which is mounted on the bracket 202.

At the beginning of its travel in this circular path with the rotating turret 253, the top end d remains in an inclined position, the guide plate 315 being bowed outwardly as at 316 to give clearance for this purpose. This guide plate 315 is formed with a top wall 317 (Fig. 10) which prevents upward displacement of the top end during such travel. The guide plate is also formed with projecting guide walls 318, the closure plug e when passing by these walls being in its closed position, as previously described. It will be observed that at the time the top end d is resting against the guide walls 318, the suction cups 311 are spaced inwardly from the top end.

Guide plate 315 is cut away at 321 (Fig. 16) so that the closure plug opening device J may be operated from its position outside of the path of travel of the top end. This closure plug opening device comprises primarily a spider 325 (Figs. 2 and 16) which carries six projecting fingers 326. Each finger terminates in a knob 327. Spider 325 is mounted upon a vertical shaft 328 which is journaled in an upper bearing 329, formed in the bracket 202, and in a lower bearing 331, formed in the table section 62. Shaft 328 carries a gear 332 which is located just above the bearing 331 and in the plane of the gear train including the gear 251 of the top inserting unit H with which it meshes. This insures rotation of the spider 325 in synchronism with the turret 253.

As a top end d being advanced along the guide plate 315 approaches the line joining the centers of the shafts 254 and 328, a finger 326 projects its knob end 327 through the slot 321 formed in the guide plate and this knob engages the closed closure plug e and hinges it into open position. The wall 312 of the inner head 282 is cut out as at 335 (Figs. 12 and 16) to provide a clearance for the closure plug when it is opened.

At the time the closure plug e is moved into open position, the top end d is brought into vertical position by rocking the end on its base within the inserting head. When the top end reaches this vertical position it comes into contact with the three suction cups 311. The cups being connected with a source of vacuum at that time hold the end rigidly for its insertion into the can body a advancing into the assembling station C.

Suction for the suction cups is valve controlled and for this purpose each suction cup is provided with a port 341 (Figs. 12 and 13). The head part 282 in the region of the upper suction cups 311 is provided with a passageway 342 and the upper suction cup ports 341 communicate with this passageway. The inner head part is also provided with a vertical passageway 343 which communicates with the passageway 342 for the two upper suction cups and with the lower suction cup by means of a short port 344. Each passageway 343 connects with a channel 345 which in turn leads into a central opening 346 (see also Fig. 4) formed longitudinally of each spindle 285.

Each spindle 285 is provided with a lateral port 347 which in one position of the spindle communicates with a horizontal passageway 348 formed in each turret sleeve 286. A port 351 extends vertically to the top surface of the turret 253, such a port being located near the inner end of each passageway.

The port 351 is closed or opened as the turret revolves around its shaft 254, this being effected by a disc valve 355 (Figs. 4 and 15) which surrounds the shaft and is feathered to it. Valve 355 is yieldably pressed into air-tight engagement with the flat top surface of the turret by a spring 356 which surrounds the shaft and which is backed up by a collar 357 pinned to the shaft.

The valve 355 therefore does not rotate but is provided with an arcuate channel 358 which is cut into the bottom surface of the valve. This channel is concentric to the axis of the turret 253 and is so spaced as to pass over all of the various ports 351 of the turret 253 during one revolution. Several ports are in communication with the channel at one time and in this way each inserting head 281 carried by the turret is vacuum controlled.

The channel 358 connects with a laterally disposed port 359 which communicates at its inner end with a radial port 361 formed in the stationary shaft 254. The shaft 254 is provided with a vertically disposed central passageway 362 which extends from just above the turret to the top of the shaft. The passageway 362 communicates with a suction pipe 363 which leads to a suitable source of vacuum such as a pump or a vacuum tank (not shown), such for example as the source of vacuum for the suction pipe 197 (Fig. 4). The valve 355 is also provided with a vertical vent port 365 which is spaced the same distance from the center of the shaft 254 as the channel 358 and by this means, the vacuum is broken at the cups after the end is inserted.

From the foregoing it will be evident that as an inserting head with its top end d crosses the line of centers between the shafts 328 and 254, this being when the top end is brought into vertical position, an unbroken communication is established between the source of vacuum and the suction cups. This is by way of the pipe 363, passageway 362, ports 361 and 359, channel 358, port 351 of that particular head, passageway 348, the hollow center 346 in the spindle 285 and thence by way of the ports, passageways and channels connecting to the suction cups. Accordingly air is withdrawn from the suction cups and a vacuous condition is established so that the top end d is drawn against the suction cups and is securely held in place while its closure plug e is being swung into its open position.

This suction-hold on the top end continues until the inserting head comes into inserting position relative to the advancing can body a. This is for about 90 degrees of travel. At the end of this travel, the top end is gently pressed into the open end of the body in the proper position relative to the inwardly projecting body bead b. The finger 313 at such time functions as a shoe horn to gently seat the top end d in the end of the can body a.

As previously stated, this is at the same time that the bottom end c is being inserted into the can body a passing through the assembling station C. Without interrupting the container's advancement, the port 351 passes beyond the end of channel 358 and then passes under the vent port 365 in the valve 355. Thereupon air rushes into the suction cups and breaks the vacuum hold. The can body with its inserted end then moves on to the creasing station K.

The bottom corner creasing unit L and the top corner creasing unit M located at the creasing station K are identical in construction and operation. A description of one such creasing unit, therefore, will apply to both and reference should be had to Figs. 1, 18, 19 and 20. The turret 129 on the bottom end side of the machine will be considered first. This turret carries a plurality of creasing heads 375, eight such heads being contemplated and disclosed herein. Each creasing head 375 is provided with a spindle 376 which is mounted for oscillation in a sleeve 377 formed as an integral part of the turret.

The turret 129 is cut away in curved pockets 378, the vertical curved wall of each pocket being concentric with the axis of the spindle. Each creasing head is oscillated so that as a can body a passes through the creasing station K the particular head involved is in the proper position for creasing the corners of the extended edge of the can body which is disposed outside of the inserted bottom end c. A head block 381 is formed as an integral part of each creasing head 375 and the face of the block is substantially square and is provided with a counter-sunk clearance center 382. This center is not utilized in connection with the bottom corner creasing unit L but does provide a clearance for the opened closure plug e of the top end d in the top corner creasing unit M.

Extending forwardly from or in advance of the forward face of each block 381 are slotted integral lugs 383, each lug being disposed at a corner of the block. A creasing blade 384 is carried in each slotted lug 383 and the four blades at the corners of each block are disposed radially of the center of the opening 382.

As the turret 129 revolves, a creasing head 375 swings around toward the outstanding adjacent edge of an advancing can body a, as illustrated in Fig. 19. The corner blades 384, which are in advance as the head is carried around the shaft 131, engage the two forward corners of the advancing can body a and press inwardly the extended body wall edge at the forward corners and forming the corner tucks f, which thereupon press against the inserted bottom end c. As the turret 129 continues to revolve and the advancing creasing head 375 continues to move forward with the can body, the two creasing blades 384 at the rear of the head next come into engagement with the rear corner edges of the can body.

At the time the can body passes the center line between the shafts 131 and 243, the creasing head being considered is brought square with the extended edge of the can body and all four corners thereupon are pressed inwardly an equal amount, forming four tucks f. This position is illustrated at the right in Fig. 19. This creasing continues without interruption on each can body that passes into the creasing station K.

The creasing head 375 at the time and after bending down the corners of the can body into end holding position, is maintained in the proper shifted position relative to the axis of the spindle 376, so that the creasing head moves with but does not further indent the can body flange as the head is released from the moving can body.

The shifting of each creasing head 375 is cam controlled. Each spindle 376 carries an arm 385 (Fig. 18) the outer end of which carries a pin 386 on which a cam roller 387 is rotatably mounted. Each roller 387 traverses a cam groove 388 cut in the upper face of a disc or face cam 389.

The cam 389 is mounted in and is bolted to an upstanding circular wall 391 which is or may be an integral part of the table section 61. This circular wall (see also Fig. 5) virtually surrounds the gear 127 which it will be recalled, rotates the turret 129. The wall is cut away to provide for meshing of the gears 125 and 135 with the gear 127. The cam 389 and the circular wall 391 thus provide a chamber which virtually encloses the gear 127.

As the turret 129 rotates around the stationary shaft 131 the walls of the cam groove 388 acting upon the cam rollers 387, oscillate the spindles 376 in proper time to move each creasing head 375 so that the corners of an advancing can body are properly creased.

The top corner creasing unit M which rotates on the shaft 243 is composed of the same units as has just been described and the creasing of the extended edge of the can body adjacent the inserted top end d takes place simultaneously with the creasing of the opposite edge of the can body adjacent its bottom end c. On the forward side of the machine the gear 240 (Fig. 5) for the top corner creasing unit M is partially enclosed by a circular wall 392 which, like the wall 391, is cut out to provide clearance openings for the meshing of gears, in this case gears 236 and 245, which mesh with the gear 240. The shafts 131 and 243 at the top are tied together by a connecting arm 395 (Figs. 1 and 18).

The advancing can body a with its inserted bottom and top ends c and d and with the corner tucks f in each body edge, is next passed into the bending station N. Here the two edges of the can body are subjected to further treatment in the two body bending and joint seaming mechanisms O located at the bending station. Each of the body bending and joint seaming mechanisms O are identical in construction and a description of one will suffice for both. Reference should now be had to Figs. 1, 3, 21, 22 and 23.

The bottom end seaming mechanism O carried by the turret 118 on the rear side of the machine or by the turret 233 for the front comprises a series of bending heads 401, eight such heads being illustrated in the disclosed preferred embodiment. Each head 401 is secured to the upper end of a spindle 402, the eight spindles being mounted for oscillation in bearing sleeves 403 which preferably are an integral part of the turret 118 or the turret 233.

Each bending head 401 at the top is formed in a substantially square block 405 which is hollowed out as at 406 to provide clearance for the closure plug e when the mechanism is used on the front of the machine for treatment of the top end d. The same construction obtains for the seaming mechanism O used on the bottom end c but in that case the clearance opening 406 may not be employed.

The inner face of each block 405 has sliding movement within one of eight curved wall pockets 408 formed in the turret 118 or in the turret 233, as the case may be. The vertical curved wall of the pocket is concentric with the center of the spindle 402 so that the bending head oscillates freely within the turret.

The outer face of each block 405 is formed with a surrounding groove 409, such a groove being composed of a top, a bottom and two side grooves, as best illustrated in Fig. 3. Each top groove 409 extends across the entire width of the block 405 as at 410 (Figs. 3 and 23) for clearance purposes. This will be referred to hereinafter. Oscillation of each spindle 402 in proper time with the rotation of the turret 118 or 233, places the groove 409 of the bending head involved in the work at the time so that the upstanding forward edge part of the can body a between the two forward corner tucks f, enters the groove and then the sides and finally the rear edge part is bent progressively over the end member thus forming the clinched edge g of the end seam joint.

At the time the can body a passes the center line between the shafts 119 and 234, the bending head 401 is centered so that the working walls of its rectangular groove 409 are applied equally to all of the edges of the can body, the clinched edge g then being complete as illustrated in Fig. 21. Without any interruption in advancement of the can body and its clinched-in ends the bending head shifts within the turret pocket so that the can body is released gently from the advancing bending head. The opposite edges of both ends of the can body are thus bent simultaneously at the bending station N.

Oscillation of each spindle 402 is cam controlled and for this purpose the spindle at its bottom end carries an arm 411 (Fig. 3) which in turn carries a cam roller 412. The various cam rollers 412 on both sides of the machine traverse the two cam grooves formed in the upper faces of two similar circular cams 413.

The cam which controls the bottom end bending mechanism is disposed directly above the gear 116, the cam being mounted on a circular wall 415 (Fig. 5) which is an integral part of the table 61. Wall 415 substantially surrounds the gear but is open at two places to provide clearance for the gears 115 and 125 mating with the gear 116. In like manner the gear 231 is surrounded by a circular wall 416 which is an integral part of table 62. Wall 416 is open for clearance of the gears 229 and 236 mating with gear 231. The wall 416 provides support for its cam 413.

At the top of the shafts 119 and 234 (Fig. 1) a connecting arm 417 joins the shafts in a rigid construction. The connecting arms 304, 395 and 417 in addition to providing for the rigid support of their respective shafts also provide for support of two top guide rails 421 (Figs. 2, 3 and 4) which extend over a major part of the length of the machine and which are spaced above the straight upper run of the conveyor A. Each guide rail 421 is V-shaped at the bottom and provides for close sliding and guiding action for the can body a by engaging in and outside of the can body beads *b* at the top. These guide rails cooperate with the conveyor A in more positively holding the body against longitudinal displacement as each operation takes place at the stations C, K and N.

Each guide rail 421 at the feed end of the machine is mounted on a bracket 422 which is an integral part of the connecting arm 304 (Fig. 4). The connecting arm 395 is formed with similar brackets 423 (Fig. 18) thus providing support for the center part of the guide rails 421. In the same manner, suitable brackets support the guide rails at station N, such brackets being integral with the connecting bar 417 (Fig. 1). It may be mentioned at this time that the clearance grooves 410 in each head 405 is for the purpose of clearing the guide rails 421 at this station N.

It will be observed that throughout the travel of a can body *a* through the various treating stations C, K and N, the plug closure *e* on each top end *d* remains open. As a can body *a* with its clinched edges *g* passes from the bending station N it moves toward the discharge station P as a formed can *h*.

As such a can is being discharged from the apparatus, its closure plug *e* is hinged outwardly to positively insure that the dispensing opening of the top end *d* is free, as best illustrated in Figs. 1, 3, 24 and 25. At the discharge station P, guide rails 425 and 426 are carried by arms 427. Each arm is bolted to the top of the extension frame 80 which it will be recalled is disposed above the conveyor shaft 37.

The guide rail 425 is straight and merely provides for retaining the can *h* against retrograde or lateral movement after the can leaves the saddle 65 of the conveyor A. It will be observed by reference to Fig. 3 that at such a time the top rails 421 are no longer above the conveyor A and the can is not held closely in the conveyor cradle.

The guide rail 426 is formed with an inclined wall 428 and as the advancing can *h* moves opposite said wall its extended closure plug *e* strikes against the inner surface of the incline and is hinged inwardly as the can advances. This presses the closure plug into its seat in the opening in the top end *d*. The assembled and completed cans *h* as they leave the conveyor A, crowd each other along to any suitable place of discharge.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In an apparatus for assembling and joining a tubular oppositely beaded body and flat end members of fibre containers, the combination of a can body conveyor for advancing the can bodies in a predetermined path of travel, said conveyor having pockets for receiving can bodies with the longitudinal axes of the bodies extending transversely of the line of travel of the conveyor, said pockets having means associated therewith for contracting the same to clamp the body against lateral displacement, each of said pockets including a plurality of inwardly projecting ridges for engaging within the opposite beads of said body to prevent longitudinal displacement, a magazine for holding a stack of bottom ends, a second magazine for holding a stack of top ends, bottom feed devices for feeding bottom ends individually from said bottom magazine, top feed devices for feeding top ends individually from said top magazine, separate oppositely disposed rotatable means disposed adjacent the path of travel of the can bodies for respectively inserting said bottom and top members in opposite ends of a said can body while the latter is held against movement in a said conveyor pocket and while said body is advancing with said conveyor, and independently rotatable means associated with said inserting means for seating said bottom and top members on said oppositely disposed can body beads.

2. In an apparatus for assembling and joining a tubular beaded body and flat end members of fibre containers, the combination of a continuously moving can body conveyor having expansible and contractible pockets for receiving in expanded position can bodies with the longitudinal axes of the bodies extending transversely of the line of travel of the conveyor and with spaced projecting wall portions of said pockets locked into engagement with said body beads when said pockets are contracted to prevent lateral and longitudinal displacement, means cooperating with the moving conveyor pockets for expanding and contracting the same for the purposes described, a rotating turret located at one side of said conveyor and outside of an open end of a conveyed can body, inserting heads carried by said turret, each head comprising an inner part and an outer part, and means for respectively partially rotating said inner and outer head parts independently and relative to said turret when the turret presents a said head to the adjacent end of the moving body to insert an end member carried by said inner and outer head parts into the body with the end member fully seated on the body bead.

3. In an apparatus for assembling and joining a tubular beaded body and flat end members of fibre containers, the combination of a conveyor for advancing fibre can bodies continuously along a path of travel, said conveyor having means for holding the can bodies against both lateral and longitudinal displacement, an outer inserting head located at one side of said conveyor and being movable toward an open end of a can body advancing with said conveyor, said outer head including an inner inserting head located within said outer head, suction devices carried by said inner head for holding a can end member in the head, means for moving both outer and inner inserting heads as a unit when approaching said conveyed can body, and means for imparting rocking movement to said inner head relative to the outer head to insert the said end member into the can body with the end member seated on the body bead.

4. In an apparatus for assembling and joining a tubular beaded body and flat end members of fibre containers, the combination of a series of operating stations, a conveyor for advancing fibre can bodies through said stations in a continuous manner, said conveyor having means for holding the can bodies against both lateral and longitudinal displacement, a rotary turret located at one side of said conveyor, an outer inserting head carried by said turret and having oscillation within the turret, an inner inserting head mounted for oscillation within said outer head, suction devices carried by said inner head for holding a can end member in the head, means for oscillating said outer and inner heads independently of each other and within said turret when the latter carries the heads as a unit inwardly toward said conveyor, said oscillating means being operative to rock said inner head in one direction to insert the suction held end member into an end of said advancing can body with the end member seated on the body bead, said oscillating means being further operative to rock said inner head in the opposite direction to remove said heads from said end member, and means for releasing the suction hold on the inserted end member.

5. In an apparatus for assembling and joining a tubular beaded body and flat end members of fibre containers, including a can body conveyor having pockets for receiving can bodies with the longitudinal axes of the bodies extending transversely of the line of travel of the conveyor, said pockets being contractible to clamp the can bodies against lateral displacement and also including means for engaging within the beads of a said body to prevent longitudinal displacement; the improvement comprising rotatable means disposed adjacent the path of travel of the can bodies for inserting an end member in an end of a said beaded can body while the latter is held against movement in a said conveyor pocket, and means carried by and cooperating with said rotatable inserting means for seating the inserted end member on the adjacent can body bead.

6. In an apparatus for assembling and joining a tubular oppositely beaded body and flat end members of fibre containers, the combination of a movable can body conveyor having pockets for receiving can bodies with the longitudinal axes of the bodies extending transversely of the line of travel of the conveyor, said pockets having means cooperating therewith for contracting the same to clamp the can bodies against lateral displacement and also including a plurality of inwardly projecting ridges for engaging within the opposite beads of said body to prevent longitudinal displacement, means for actuating said conveyor to continuously advance a can body held thereby through a series of operating stations, rotatable means located at one of said stations adjacent the path of travel of said can body for inserting an end member in an end of a said beaded can body while said body is held against movement in a said conveyor pocket, means for feeding said end member to said inserting means, independently rotatable means cooperating with said inserting means for seating said inserted end member on a said body bead while the can body is advancing, and creasing devices located at another of said stations and operating on the moving can body for tucking in the corners of the said beaded end of the body to hold said inserted end member on said body bead.

7. In an apparatus for assembling and joining a tubular oppositely beaded can body and flat end members of fibre containers, the combination of a can body conveyor having pockets for receiving can bodies with the longitudinal axes of the bodies extending transversely of the line of travel of the conveyor, said pockets comprising a processional series of pivotally mounted cradles each having angularly disposed relatively movable walls, one of said walls of each cradle having a right angled ridge disposed adjacent one end of the pocket and shaped to fit inside a said bead of a can body, feeding devices for positioning a can body in a conveyor pocket when the pivotal walls of the pocket are disposed in relatively open position, means for guiding a conveyor pocket along a straight line of travel with the pocket walls in contracted position clamped against a can body with the ridges of said right angled pocket walls positioned in engagement with said can body bead to hold the body against lateral and longitudinal displacement, means for individually feeding can end members, rotatable means for receiving a said fed end member and for inserting the same in an end of said clamped can body, and means cooperating with said inserting means for seating the inserted end on the adjacent can body bead.

8. In an apparatus for assembling and joining a tubular oppositely beaded can body and flat end members of fibre containers, the combination of a continuously moving can body conveyor for advancing the can bodies in spaced relation in a predetermined path of travel through a plurality of working stations, said conveyor including a plurality of pivotally mounted cradles respectively movable to open and closed positions, said open cradles receiving can bodies with the longitudinal axes of the bodies extending transversely of the line of travel of the conveyor and with the body beads adjacent the sides of the conveyor, each of said cradles having ridges thereon formed to engage into said body beads when said cradles are in closed position and when said conveyor is moving in a straight line of travel to hold a said can body against transverse and longitudinal displacement, independent rotatable means respectively disposed on opposite sides of said conveyor at a said working station for simultaneously inserting bottom and top end members into the opposite open ends of said can bodies, means cooperating with each of said inserting means for seating said end members respectively on said opposed body beads, separate creasing means respectively disposed on opposite sides of said conveyor at a further advanced working station for simultaneously tucking in the corners of the opposite ends of the can body to hold said inserted end members on said opposed body beads, and joint seaming means spaced on opposite sides of said conveyor at a still further advanced working station for simultaneously bending the opposite ends of said body inwardly against said bottom and top end members.

9. In an apparatus for assembling and joining a tubular oppositely beaded body and flat end members of fibre containers, the combination of a moving can body conveyor having pockets for receiving can bodies with the longitudinal axes of the bodies extending transversely of the line of travel of the conveyor, said pockets having means associated therewith for contracting the same to clamp the body against lateral displacement, each of said pockets including a plurality of inwardly projecting ridges for engaging within the opposite beads of said body to prevent longitudinal displacement of said body, rotating means located on one side of said conveyor and in position adjacent one end of a said conveyed can body for inserting a flat end member into the adjacent end of said can body, means associated and cooperating with said rotating means for seating the inserted end member on a said body bead, and suction means carried by and cooperating with said rotating means for holding said end member thereon during the inserting and seating operations.

10. In an apparatus for assembling and joining a tubular oppositely beaded body and flat end members of fibre containers, the combination of a movable can body conveyor having pockets for receiving can bodies with the longitudinal axes of the bodies extending transversely of the line of travel of the conveyor, said pockets having means cooperating therewith to clamp a said can body against lateral displacement, said pockets each including a plurality of inwardly projecting ridges for engaging within the said opposite beads of said body to prevent longitudinal displacement thereof, independent spaced rotatable means disposed on opposite sides of the line of travel of said conveyed can bodies for individually receiving and holding a said received end member, means for actuating said independent rotatable means into a further rotative position in synchronism with said conveyor movement for inserting the two individually held end members into the two ends of said conveyed can body, and means for actuating said rotatable means to seat said inserted end members respectively on said opposed can body beads.

11. In an apparatus for assembling and joining a tubular oppositely beaded body and flat end members of fibre containers, the combination of a can body conveyor having pockets for receiving can bodies with the longitudinal axes of the bodies extending transversely of the line of travel of the conveyor, said pockets having means thereon for clamping a said can body against both lateral and longitudinal displacement by engagement within said body beads, a magazine for retaining flat end members in stack formation, a rotating transfer unit for pulling off an individual end member from the stack of end members within said magazine, rotating means located adjacent said transfer unit and disposed to one side of the conveyor adjacent the path of travel of the can body for receiving a said end member from said transfer unit while in one rotative position and for inserting it while in another rotative position into an end of the can body within said conveyor, and means for actuating said rotating means to seat said inserted end member on the body bead.

12. In an apparatus for assembling and joining a tubular oppositely beaded body and flat end members of fibre containers, the combination of a can body conveyor having pockets for receiving can bodies with the longitudinal axes of the bodies extending transversely of the line of travel of the conveyor, said pockets cooperating with one another and having means thereon to clamp the body against both lateral and longitudinal displacement by respectively engaging the body walls within the beads of said body, separate magazines located on opposite sides of said conveyor for holding bottom and top end members each in stack formation, transfer units located one adjacent each of said magazines for removing individual end members from the stacks of their respective magazines, and separate rotatable means respectively located on opposite sides of said conveyor and adjacent said magazines for receiving a bottom end member from one transfer unit and a top end member from the other transfer unit while respectively in one rotative position and while in a further rotative position for respectively inserting said bottom and top end members into opposite ends of a can body clamped in its conveyor pocket, said rotatable means being further operative to seat said inserted top and bottom end members respectively on the said opposite body beads.

13. In an apparatus for assembling and joining a tubular beaded can body and flat end members of fibre containers, the combination of a can body conveyor having contractable pockets for receiving can bodies when the pockets are in expanded position, spaced sprockets for supporting and advancing said conveyor, tracks disposed between said sprockets for guiding said conveyor in a straight line of travel, said conveyor pockets comprising pivotally mounted cradles formed with right angled walls having ridges thereon to engage against said can body beads, adjacent walls of said pockets cooperating to clamp a can body in a said pocket with said ridges positioned against the can body bead with the longitudinal axis of the body extending transversely of the line of travel of the conveyor when said cradles are moving over the conveyor tracks, and bodily rotatable means disposed adjacent the path of travel of the advancing can bodies for inserting an end member in an end of said clamped body, said bodily rotatable inserting means being further axially rotatable for seating the inserted end on the adjacent can body bead.

14. In an apparatus for assembling and joining a tubular oppositely beaded can body and flat end members of fibre containers, the combination of a can body conveyor having a plurality of pivotally mounted expansible and contractible pockets for receiving and advancing can bodies in a predetermined path of travel with the longitudinal axes of the bodies extending transversely of the path of travel of the conveyor, the walls of a said pocket having means thereon for engaging against said can body beads when the conveyor pockets are contracted to prevent lateral and longitudinal displacement of said bodies, rotatable means located at one side of said conveyor in the path of travel of the can bodies, an inserting head carried by said rotatable means and having movement relative to the conveyor and to said rotating means, means cooperating with said moving conveyor pockets for alternately contracting and expanding the same, and means for partially rotating said head to insert an end member into the open end of a said can body being advanced by said conveyor to seat said inserted end member against the adjacent body bead.

15. In an apparatus for assembling and joining a tubular oppositely beaded body and flat end members of fibre containers, the combination of a continuously moving can body conveyor having a plurality of pivotally mounted expansible and contractable pockets for receiving in expanded position can bodies with the longitudinal axes of the bodies extending transversely of the line of travel of the conveyor and with spaced projecting portions of the pocket walls respectively engaging against the said opposed body beads when the conveyor pockets are contracted to prevent lateral and longitudinal displacement, means cooperating with said pivotally mounted conveyor pockets for expanding and contracting the same, a rotating turret located at one side of said conveyor adjacent one end of a said conveyed can body, inserting heads carried by said turret and having relative movement therewith, and means for moving a said inserting head in said turret when the latter moves the head adjacent the open end of an advancing can body to insert an end member carried by the said head into the advancing can body with the end member seated on the adjacent can body bead.

JOHN F. PETERS.